United States Patent
Karandish et al.

(10) Patent No.: US 11,403,355 B2
(45) Date of Patent: Aug. 2, 2022

(54) INGESTION AND RETRIEVAL OF DYNAMIC SOURCE DOCUMENTS IN AN AUTOMATED QUESTION ANSWERING SYSTEM

(71) Applicant: Ai Software, LLC, Saint Louis, MO (US)

(72) Inventors: David Karandish, Saint Louis, MO (US); David Costenaro, Saint Louis, MO (US); Joshua Anyan, Saint Louis, MO (US); Christopher Duerr, Saint Louis, MO (US)

(73) Assignee: AI SOFTWARE, LLC, St. Louis, MO (US)

(*) Notice: Subject to any disclaimer, the term of this patent is extended or adjusted under 35 U.S.C. 154(b) by 294 days.

(21) Appl. No.: 16/545,295

(22) Filed: Aug. 20, 2019

(65) Prior Publication Data

US 2021/0056150 A1 Feb. 25, 2021

(51) Int. Cl.
*G06F 16/9535* (2019.01)
*G06F 16/951* (2019.01)
(Continued)

(52) U.S. Cl.
CPC .... *G06F 16/9535* (2019.01); *G06F 16/24578* (2019.01); *G06F 16/951* (2019.01); *G06N 3/04* (2013.01); *G06N 3/08* (2013.01)

(58) Field of Classification Search
CPC .......... G06F 16/9535; G06F 16/24578; G06F 16/951; G06N 3/04; G06N 3/08
(Continued)

(56) References Cited

U.S. PATENT DOCUMENTS 6,028,601 A 2/2000 Machiraju et al.
9,330,084 B1 5/2016 Kadambi et al.
(Continued)

OTHER PUBLICATIONS

Cer et al., "Universal Sentence Encoder," Computer Science, Computation and Language, arXiv:1803.11175v2 [cs.CL], Apr. 12, 2008.
(Continued)

*Primary Examiner* — Hosain T Alam
*Assistant Examiner* — Nicholas E Allen
(74) *Attorney, Agent, or Firm* — Bryan Cave Leighton Paisner LLP

(57) ABSTRACT

A method including generating an index comprising (a) question-answer pairs generated based at least in part on a set of ingested source documents and (b) respective location metadata associated with each of the question-answer pairs. The respective location metadata can include a source document identifier of a first ingested source document of the set of ingested source documents and one or more location delimiters indicating a location of target text in the first ingested source document. The target text can correspond to a stored answer of a respective one of the question-answer pairs associated with the respective location metadata. The method also can include receiving a user question from a user. The user question can correspond to a question of a first question-answer pair of the question-answer pairs of the index. The method additionally can include determining a first answer to the user question based at least in part on the respective location metadata associated with the first question-answer pair. Other embodiments are disclosed.

24 Claims, 13 Drawing Sheets

(51) Int. Cl.

| | |
|---|---|
| *G06N 3/04* | (2006.01) |
| *G06F 16/2457* | (2019.01) |
| *G06N 3/08* | (2006.01) |

(58) Field of Classification Search
USPC .......................................................... 707/728
See application file for complete search history.

(56) References Cited

U.S. PATENT DOCUMENTS

| | | | |
|---|---|---|---|
| 2005/0060301 | A1 | 3/2005 | Seki et al. |
| 2007/0196804 | A1 | 8/2007 | Yoshimura et al. |
| 2011/0275047 | A1 | 11/2011 | Gomes et al. |
| 2012/0078902 | A1* | 3/2012 | Duboue ................ G06F 16/334 707/736 |
| 2012/0331003 | A1 | 12/2012 | Chu-Carroll et al. |
| 2014/0281895 | A1 | 9/2014 | Tay et al. |
| 2014/0358890 | A1 | 12/2014 | Chen et al. |
| 2015/0186515 | A1 | 7/2015 | Rao et al. |
| 2015/0193682 | A1 | 7/2015 | Baughman et al. |
| 2015/0278264 | A1 | 10/2015 | Balani et al. |
| 2016/0012087 | A1 | 1/2016 | Balani et al. |
| 2016/0018968 | A1 | 1/2016 | Wilson et al. |
| 2016/0232221 | A1 | 8/2016 | McCloskey et al. |
| 2017/0140304 | A1 | 5/2017 | Beamon et al. |
| 2018/0150748 | A1 | 5/2018 | Bastide et al. |
| 2018/0246890 | A1 | 8/2018 | Brown et al. |
| 2018/0260472 | A1* | 9/2018 | Kelsey ................. G06F 40/30 |
| 2019/0095522 | A1* | 3/2019 | Galitsky ............... G06F 16/322 |
| 2019/0130251 | A1* | 5/2019 | Lao ...................... G06N 3/006 |
| 2019/0243900 | A1* | 8/2019 | Gan ....................... G06F 16/00 |

OTHER PUBLICATIONS

Polamuri, "Five Most Popular Similarity Measures Implementation in Python," https://dataaspirant.com/2015/04/11/five-most-popular-similarity-measures-implementation-in-python/, pp. 1-13, Apr. 11, 2015, accessed on Aug. 4, 2019.

Devlin et al., "BERT: Pre-Training of Deep Bidirectional Transformers for Language Understanding," Computer Science, Computation and Language, arXiv:1810.04805v2 [cs.CL], pp. 1-16, May 24, 2019.

Github, "Mozilla / Readability: A Standalone Version of the Readability Lib," https://github.com/mozilla/readability, pp. 1-4, accessed on Aug. 3, 2019.

Yang et al., "Multilingual Universal Sentence Encoder for Semantic Retrieval," Google AI Blog, https://ai.googleblog.com/2019/07/multilingual-universal-sentence-encoder.html, pp. 1-4, Jul. 12, 2019, accessed on Aug. 4, 2019.

Devlin et al., "Open Sourcing BERT: State-of-the-Art Pre-Training for Natural Language Processing," Google AI Blog, https://ai.googleblog.com/2018/11/open-sourcing-bert-state-of-art-pre.html, pp. 1-4, Nov. 2, 2018, accessed on Aug. 3, 2019.

"How Intent Classification Works in NLU," in Natural Language Processing, https://mrbot.ai/blog/natural-language-processing/understanding-intent-classification/, pp. 1-14, Sep. 2, 2018.

Scikit Learn, "sklearn.feature_extraction.text.TfidfVectorizer," https://scikit-learn.org/stable/modules/generated/sklearn.feature_extraction.text.TfidfVectorizer.html, pp. 1-8, accessed on Aug. 3, 2019.

Wikipedia, "Approximate String Matching," https://en.wikipedia.org/wiki/Approximate_string_matching, pp. 1-4, accessed on Aug. 4, 2019.

Wikipedia, "Chatbot," https://en.wikipedia.org/wiki/Chatbot, pp. 1-10, accessed on Aug. 3, 2019.

Wikipedia, "Cosine Similarity," https://en.wikipedia.org/wiki/Cosine_similarity, pp. 1-6, accessed on Aug. 4, 2019.

Wikipedia, "Natural-Language Understanding," https://en.wikipedia.org/wiki/Natural-language_understanding, pp. 1-5, accessed on Aug. 4, 2019.

Wikipedia, "Question Answering," https://en.wikipedia.org/wiki/Question_answering, pp. 1-6, accessed on Aug. 4, 2019.

Wikipedia, "Regular Expression," https://en.wikipedia.org/wiki/Regular_expression, pp. 1-23, accessed on Aug. 3, 2019.

Wikipedia, "Sentence Embedding," https://en.wikipedia.org/wiki/Sentence_embedding, pp. 1-2, accessed on Aug. 4, 2019.

Wikipedia, "tf-idf," https://en.wikipedia.org/wiki/Tf-idf, pp. 1-6, accessed on Aug. 3, 2019.

Zhao et al., "Paragraph-Level Neural Question Generation with Maxout Pointer and Gated Self-Attention Networks," Proceedings of the 2018 Conference on Empirical Methods in Natural Language Processing, pp. 3901-3910, Brussels, Belgium, Oct. 31-Nov. 4, 2018.

Zhou et al., "Neural Question Generation from Text: A Preliminary Study," Computer Science, Computation and Language, arXiv:1704.01792v3 [cs.CL], pp. 1-6, Apr. 18, 2017.

* cited by examiner

812

| 910 – Transforming an answer of the question-answer pair into a first numeric vector representation |

| 920 – Transforming each of the location delimiters into second numeric vector representations |

| 1010 – Transforming an ingested source document identified by the source document identifier into vector embeddings |

| 1020 – Determining similarity scores for portions of the vector embeddings |

| 1030 – Selecting a highest-ranked portion of the portions of the vector embeddings |

| 1040 – Determining the first answer based on the highest-ranked portion |

FIG. 10

INGESTION AND RETRIEVAL OF DYNAMIC SOURCE DOCUMENTS IN AN AUTOMATED QUESTION ANSWERING SYSTEM

TECHNICAL FIELD

This disclosure relates generally to knowledge management in computerized information systems and more particularly to ingestion and retrieval of information in automated question answering systems.

BACKGROUND

With increased usage of computer systems and computer networks, vast amounts of information have become available. As users try to find relevant information, question answering systems have become more common. Question answering systems, such as chatbots, generally provide automated mechanisms for users to ask questions in a natural language form and receive answers to those questions. Many question answering systems cache a copy of source documents so that the cached information will be available when answering questions. However, the original source documents can be dynamic and subject to change, which can result in the cached information and the corresponding answers becoming stale and outdated.

BRIEF DESCRIPTION OF THE DRAWINGS

To facilitate further description of the embodiments, the following drawings are provided in which:

FIG. 9 illustrates a flow chart for block of performing secure ingestion, according to an embodiment; and FIG. 10 illustrates a flow chart for block of performing secure retrieval, according to an embodiment.

Figure 1:
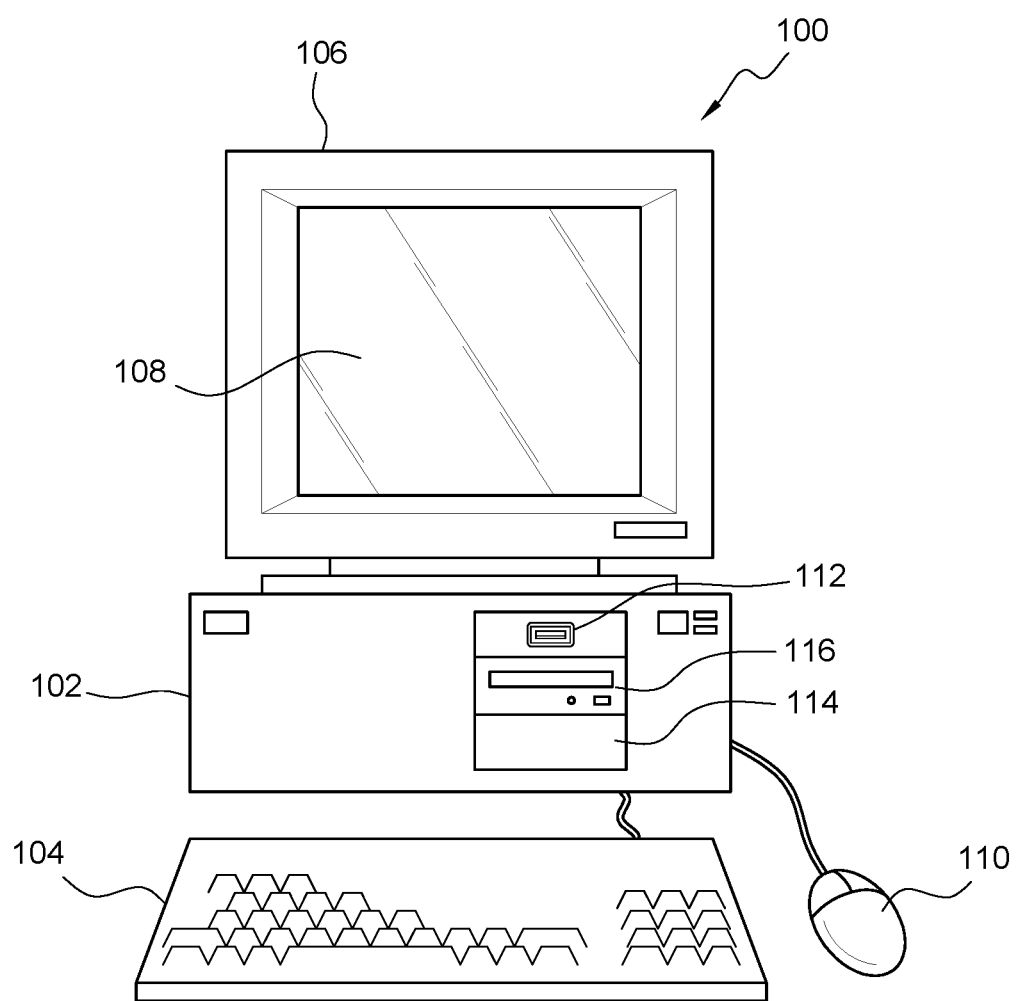
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one-tenth of a second, one-half of a second, one second, two second, five seconds, or ten seconds.

DESCRIPTION OF EXAMPLES OF EMBODIMENTS

Various embodiments can include a system including one or more processors and one or more non-transitory computer-readable media storing computing instructions configured to run on the one or more processors and perform certain acts. The acts can include generating an index comprising (a) question-answer pairs generated based at least in part on a set of set of ingested source documents and (b) respective location metadata associated with each of the question-answer pairs. The respective location metadata can include a source document identifier of a first ingested source document of the set of ingested source documents and one or more location delimiters indicating a location of target text in the first ingested source document. The target text can correspond to a stored answer of a respective one of the question-answer pairs associated with the respective location metadata. The acts also can include receiving a user question from a user. The user question can correspond to a question of a first question-answer pair of the question-answer pairs of the index. The acts additionally can include determining a first answer to the user question based at least in part on the respective location metadata associated with the first question-answer pair.

A number of embodiments can include a method being implemented via execution of computing instructions configured to run at one or more processors and stored at one or more non-transitory computer-readable media. The method can include generating an index comprising (a) question-answer pairs generated based at least in part on a set of ingested source documents and (b) respective location metadata associated with each of the question-answer pairs. The respective location metadata can include a source document identifier of a first ingested source document of the set of ingested source documents and one or more location delimiters indicating a location of target text in the first ingested source document. The target text can correspond to a stored answer of a respective one of the question-answer pairs associated with the respective location metadata. The method also can include receiving a user question from a user. The user question can correspond to a question of a first question-answer pair of the question-answer pairs of the index. The method additionally can include determining a first answer to the user question based at least in part on the respective location metadata associated with the first question-answer pair.

Figure 2:
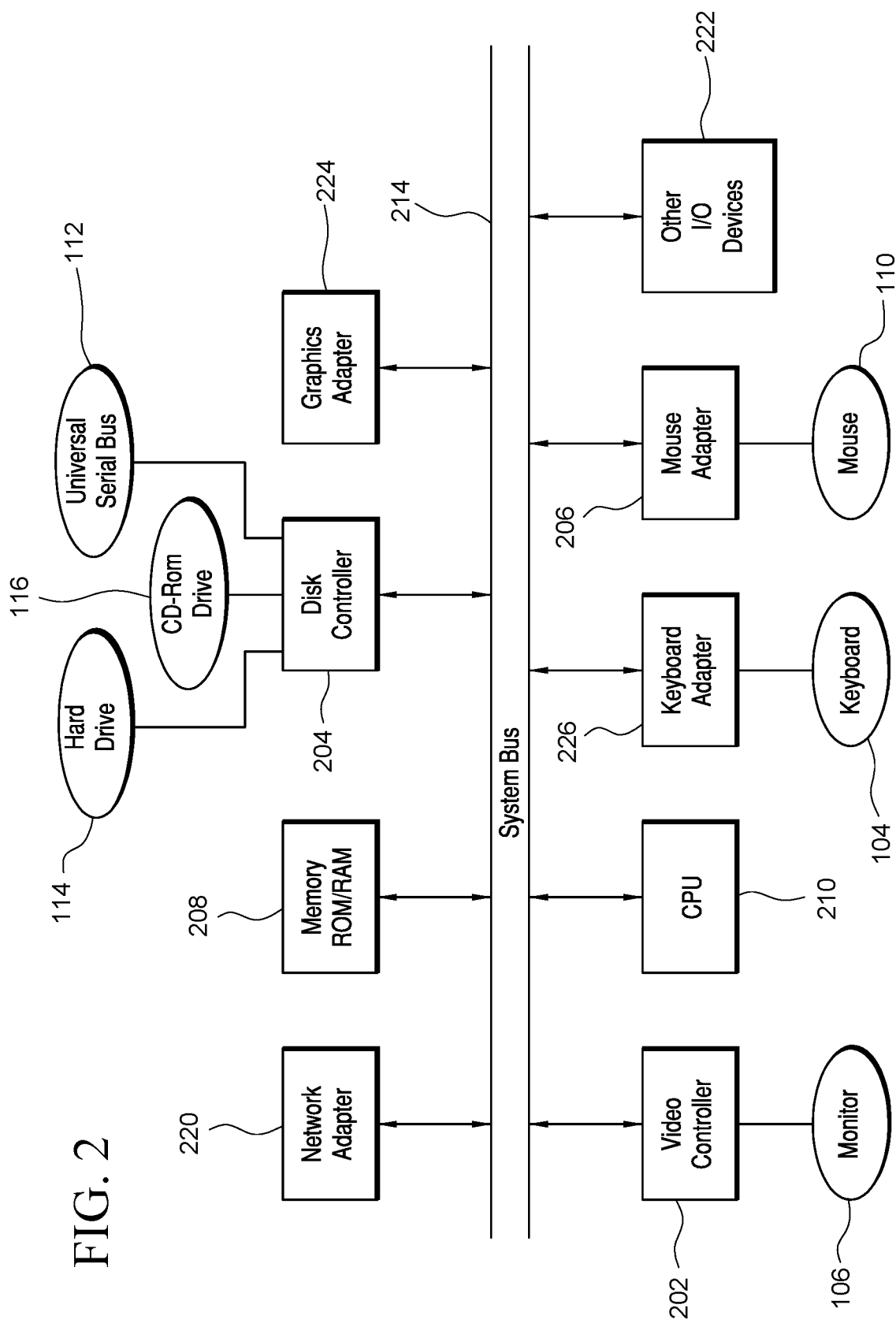
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can includes one or more of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, or (v) the Windows Mobile™ operating system by Microsoft Corp. of Redmond, Wash., United States of America.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 100) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
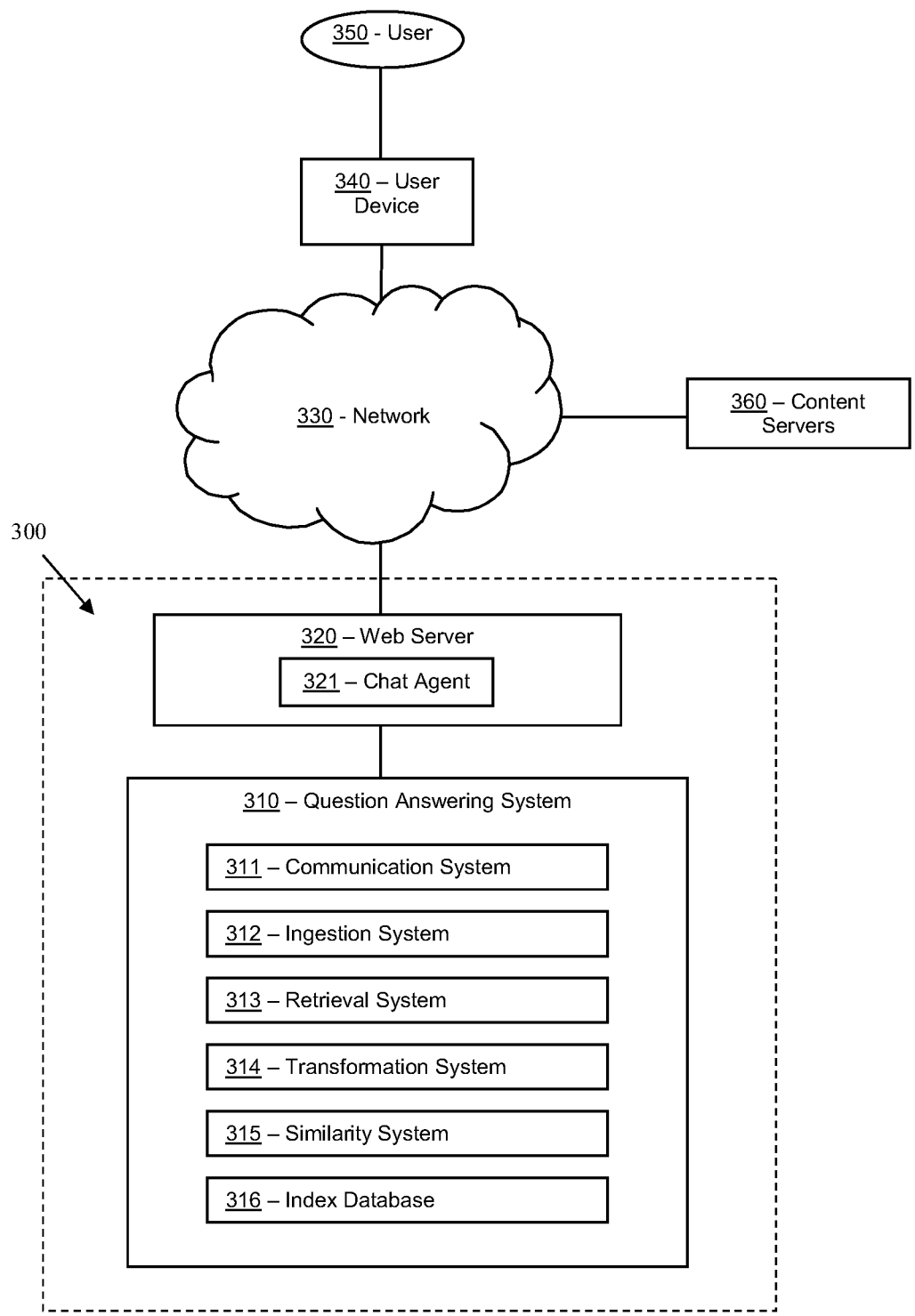
FIG. 3 illustrates a block diagram of a system for ingestion and retrieval or dynamic source documents in an automated question answering system, according to an embodiment.

Turning ahead in the drawings, FIG. 3 illustrates a block diagram of a system 300 that can be employed for ingestion and retrieval or dynamic source documents in an automated question answering system, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. In some embodiments, system 300 can include a question answering system 310 and/or web server 320.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Question answering system 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host question answering system 310 and web server 320. In some embodiments, question answering system 310 can be integrated with web server 320. Additional details regarding question answering system 310 and/or web server 320 are described herein.

In some embodiments, web server 320 can be in data communication through a network 330 with one or more user devices, such as a user device 340, and/or with one or more content servers 360. Network 330 can be the Internet or another network, such as an intranet or another suitable network. In a number of embodiments, user device 340 can be used by users, such as a user 350. In many embodiments, web server 320 can host one or more websites, one or more mobile application servers, one or more text messaging servers, and/or one or more other suitable servers or interfaces for communication with user device 340. In many embodiments, user device 340 can include a web browser, which can be used to display webpages from the website hosted by system 300. For example, the web browser can include Google Chrome, Firefox, Internet Explorer, Opera, Safari, Microsoft Edge, or another suitable web browser. In the same or other embodiments, user device 340 can include a mobile application configured to communicate with a mobile application server in web server 320. In the same or other embodiments, user device 340 can include a text messaging application and/or other suitable communication applications for communication with web server 320.

Figure 7A:
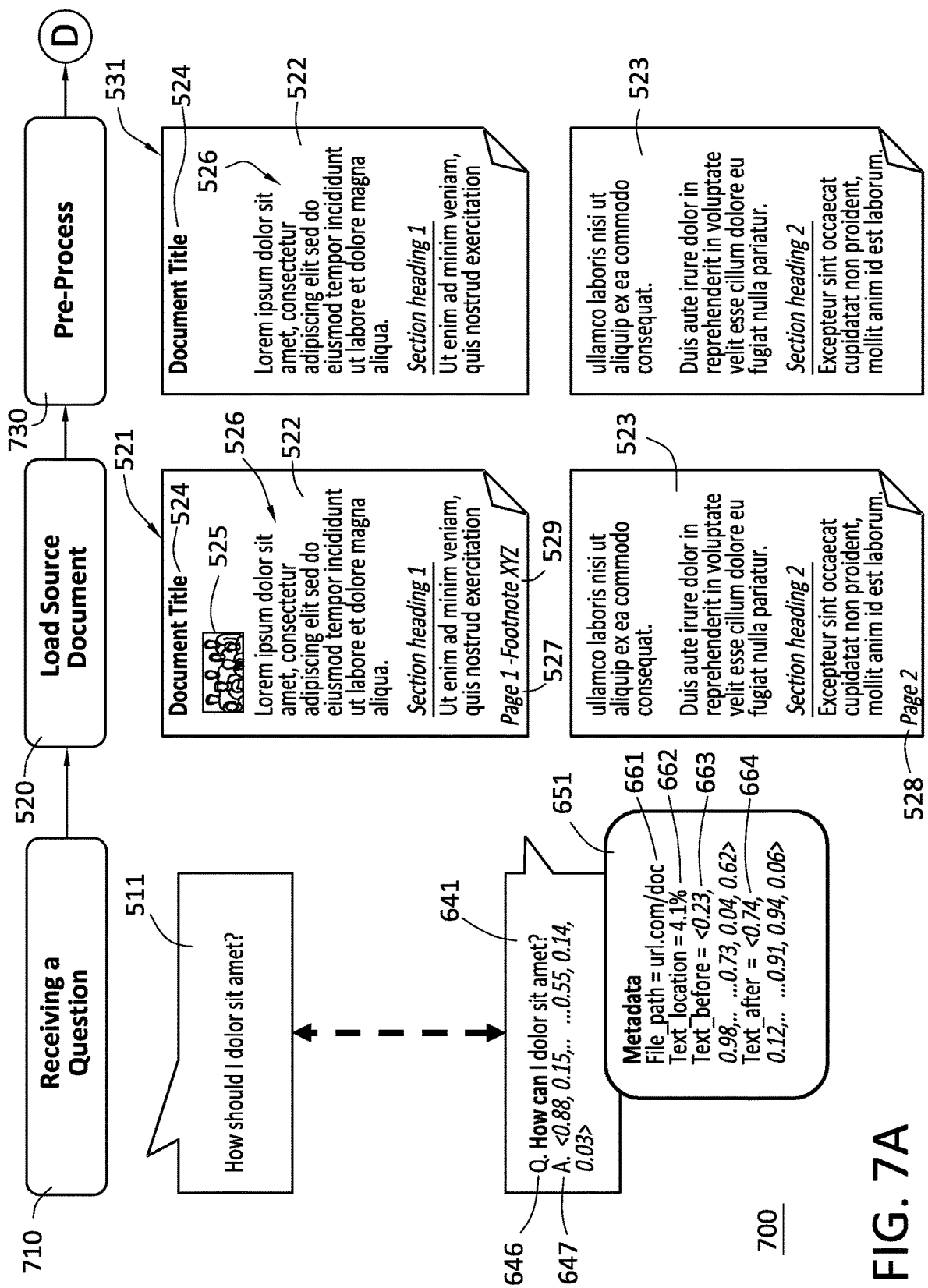
FIGS. 7A and 7B illustrate a flow chart for a method of retrieval and presentment with enhanced security, according to an embodiment.
Figure 7B:
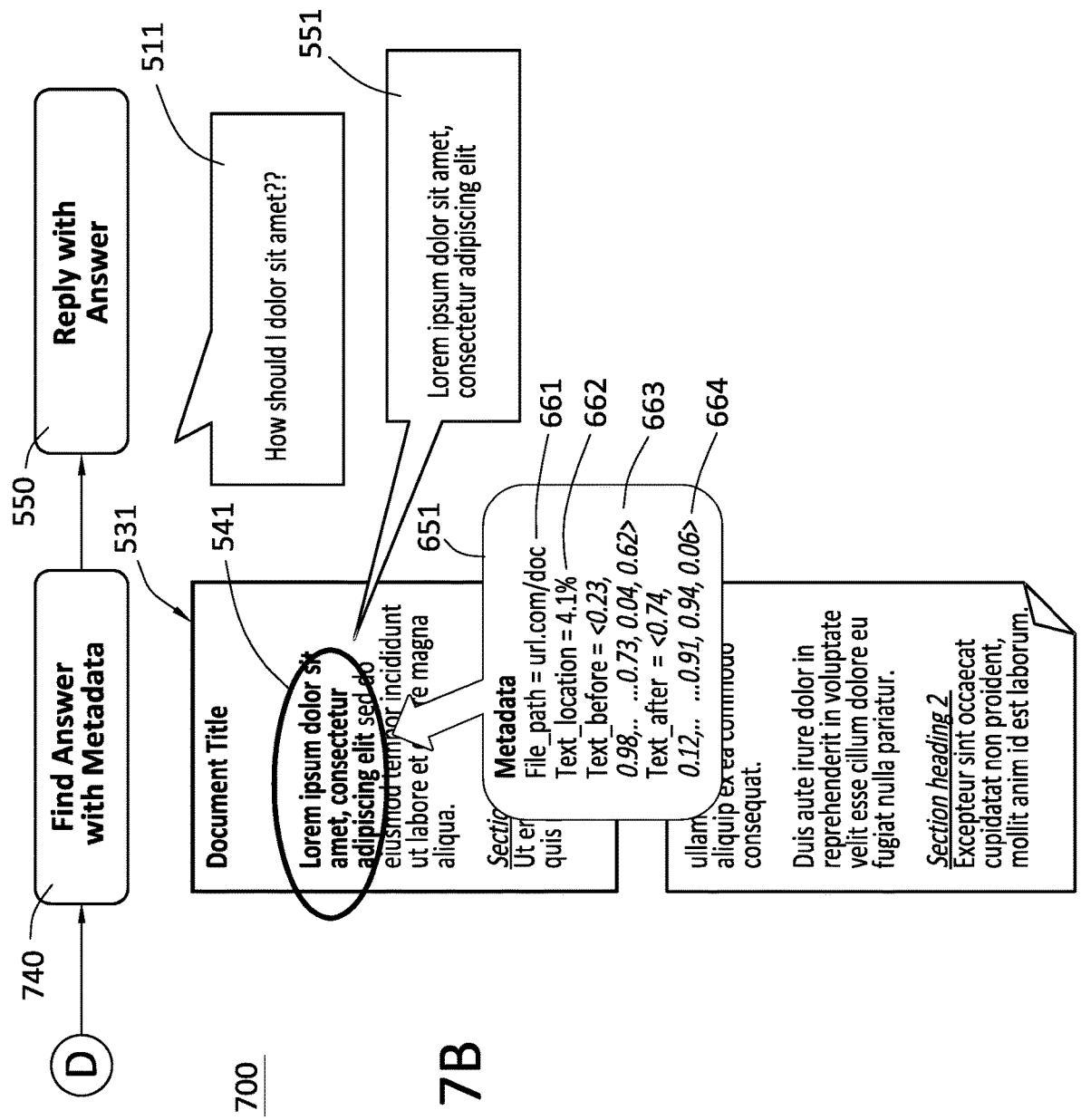
Figure 8:
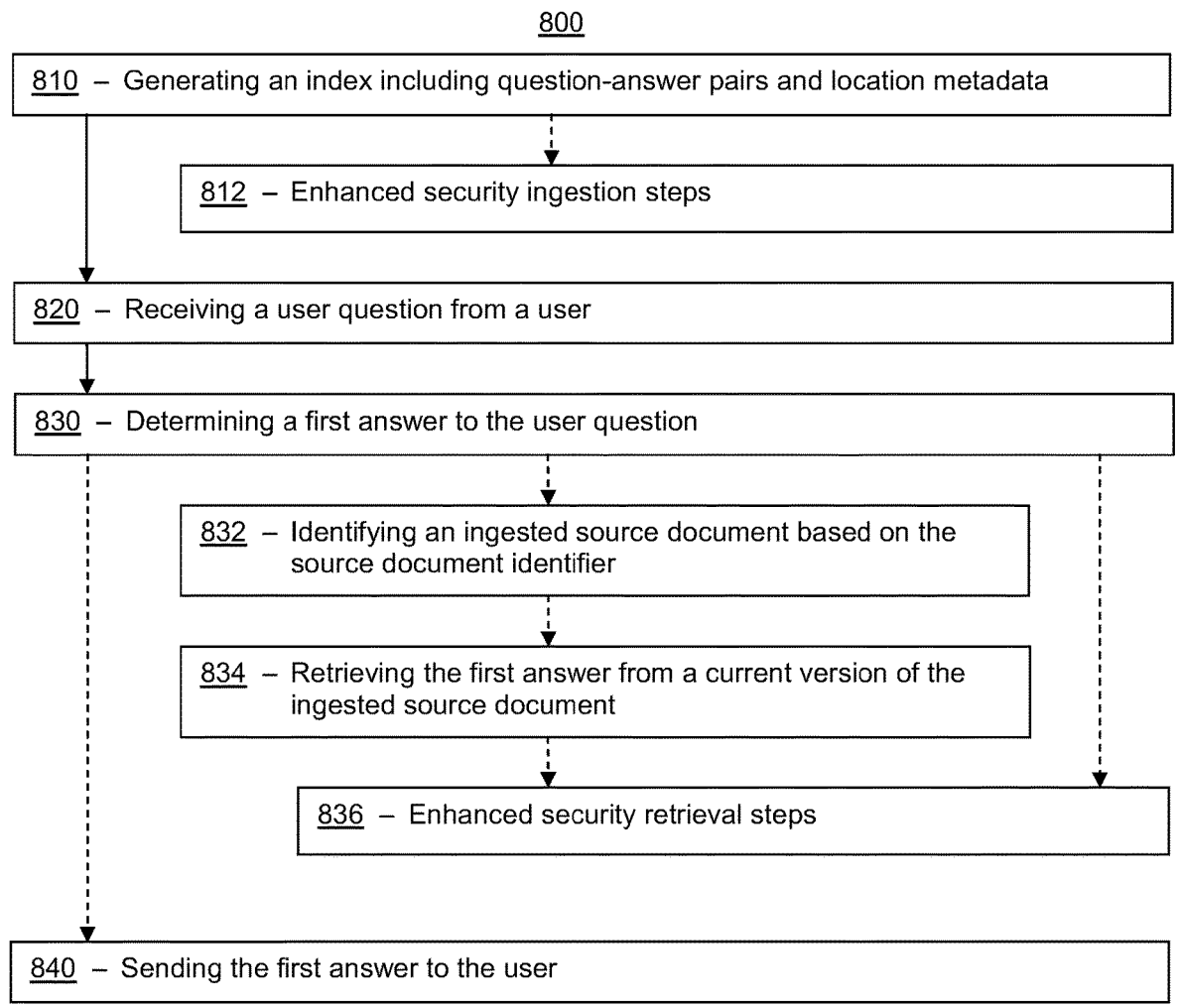
FIG. 8 illustrates a flow chart for a method of ingestion and retrieval of dynamic source documents in an automated question answering system, according to an embodiment.

In many embodiments, web server 320 can include a chat agent 321, such as an automated chat agent (e.g., a chatbot). In many embodiments, chat agent 321 can provide a natural language chat interface that is integrated with question answering system 310. In many embodiments, web server 320 can host and/or provide an interface to question answering system 310. As an example, user 350 can use user device 340 to send a question to chat agent 321, which can send the question to question answering system 310, and question answering system 310 can determine an answer to be returned through chat agent 321 to user device 340 in response to the question. In several embodiments, question answering system 310 can perform an ingestion process, such as method 400 (FIGS. 4A and 4B, described below) and/or method 600 (FIGS. 6A and 6B, described below), which can be followed by a retrieval and presentment process, such as method 500 (FIGS. 5A and 5B, described below) and/or method 700 (FIGS. 7A and 7B, described below). In a number of embodiments, question answering system 310 can perform a method of ingestion and retrieval of dynamic source documents in an automated question answering system, such as (i) performing method 400 (FIGS. 4A and 4B, described below) followed by method 500 (FIGS. 5A and 5B, described below), (ii) performing method 600 (FIGS. 6A and 6B, described below) followed by method 700 (FIGS. 7A and 7B, described below), or (iii) performing method 800 (FIG. 8, described below).

In a number of embodiments, an internal network that is not open to the public can be used for communications between question answering system 310 and web server 320 within system 300. Accordingly, in some embodiments, question answering system 310 (and/or the software used by such systems) can refer to a back end of system 300 operated by an operator and/or administrator of system 300, and web server 320 (and/or the software used by such systems) can refer to a front end of system 300, as is can be accessed and/or used by one or more users, such as user 350, using user device 340. In these or other embodiments, the operator and/or administrator of system 300 can manage system 300, the processor(s) of system 300, and/or the memory storage unit(s) of system 300 using the input device(s) and/or display device(s) of system 300. In other embodiments, question answering system 310 and web server 320 can communicate through a public network, such as the Internet.

In certain embodiments, the user devices (e.g., user device 340) can be desktop computers, laptop computers, mobile devices, and/or other endpoint devices used by one or more users (e.g., user 350). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, or (v) the Windows Mobile™ operating system by Microsoft Corp. of Redmond, Wash., United States of America.

In many embodiments, question answering system 310 and/or web server 320 can each include one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to question answering system 310 and/or web server 320 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of question answering system 310 and/or web server 320. In a similar manner, the processors and/or the non-transitory computer-readable media can be local and/or remote to each other.

Meanwhile, in many embodiments, question answering system 310 and/or web server 320 also can be configured to communicate with one or more databases, such as an index database 316. The one or more databases can include data used in ingesting and retrieving source documents for question answering, for example. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between question answering system 310 and/or web server 320, and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In some embodiments, question answering system 310 can include a communication system 311, an ingestion system 312, a retrieval system 313, a transformation system 314, a similarity system 315, index database 316, and/or other suitable systems and/or databases. In many embodiments, the systems of question answering system 310 can be modules of computing instructions (e.g., software modules) stored at non-transitory computer readable media that operate on one or more processors. In other embodiments, the systems of question answering system 310 can be implemented in hardware. Communication system 311 can provide a communication interface with web server 320, chat agent 321, and/or with network 330. Ingestion system 312 can process content in content servers 360, find answers, generate questions, and generate an index in index database 316. Retrieval system 313 can receive questions asked by users, such as user 350, find answers to such questions, and return those answers to the users in response to the questions. Transformation system 314 can be used to transform information to be stored in index database 316 and/or used by one or more of the systems of question answering system 310 into one or more other data formats, such as secure and/or obfuscated data formats. Similarity system 315 can be used in finding answers to questions based on similarity, as described below in further detail. Further details regarding the systems of question answering system 310 are described herein. The systems of question answering system 310 described herein are merely exemplary, and other suitable arrangements of systems within question answering system 310 are contemplated.

In a number of embodiments, content servers 360 can include source documents that include content that can be used by question answering system 310 for answering questions posed by users (e.g., user 350). Source documents can be files, webpages, or other suitable sources of content. Content can be any suitable type of information. For example, content servers 360 can be one or more servers of a company intranet that host webpages that provide information about a company's policies. As another example, content servers 360 can be one or more servers connected to the Internet, which can host webpages that provide information about one or more topics or general fields of knowledge. In some embodiments, content servers 360 can be integrated with web server 320 and/or question answering system 310, such as hosted on a common computer system (e.g., 100 (FIG. 1)). In other embodiments, content servers 360 can be separate from web server 320 and/or question answering system 310, as shown in FIG. 3.

Figure 4A:
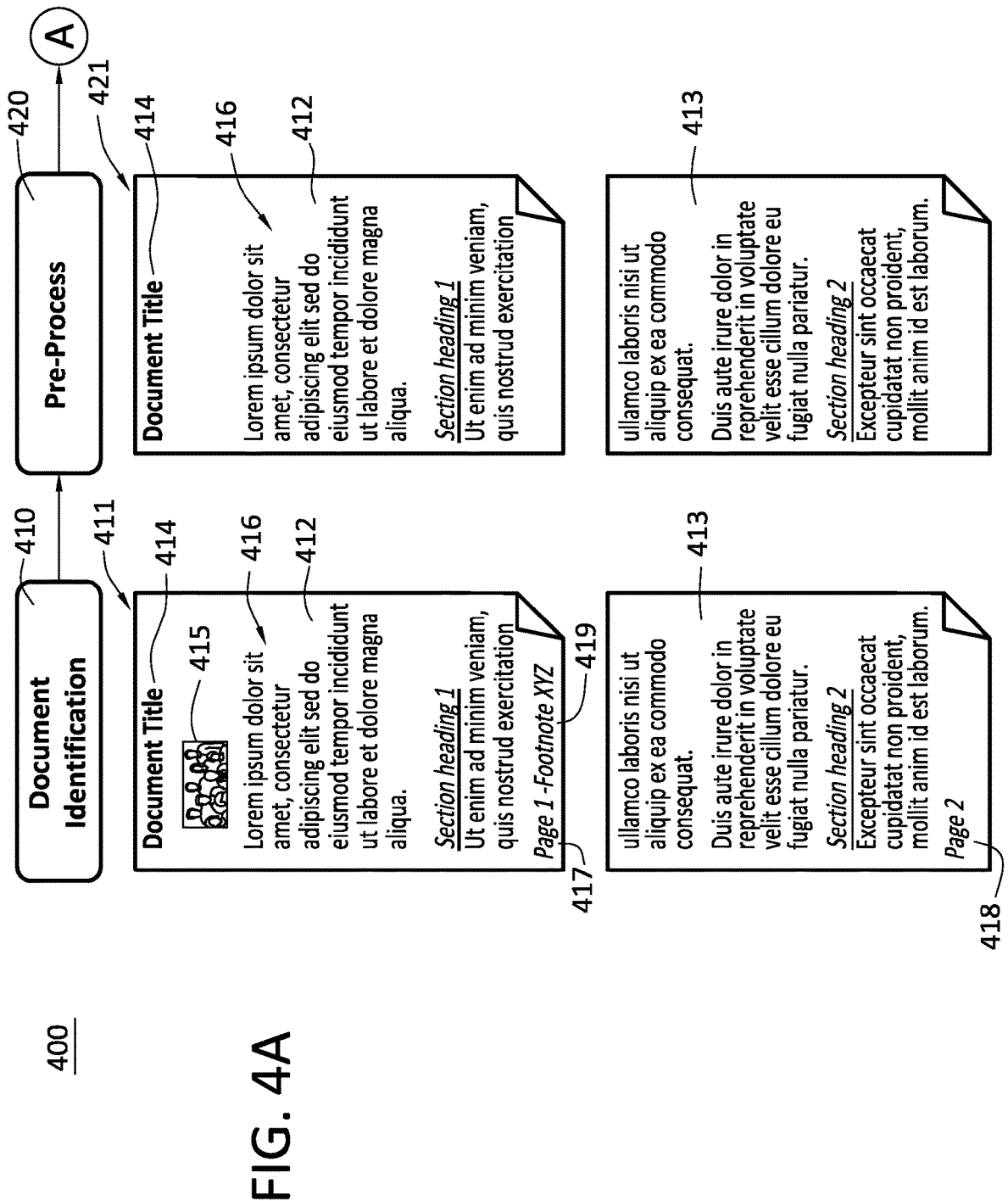
FIGS. 4A and 4B illustrate a flow chart for a method of ingestion, according to an embodiment.
Figure 4B:
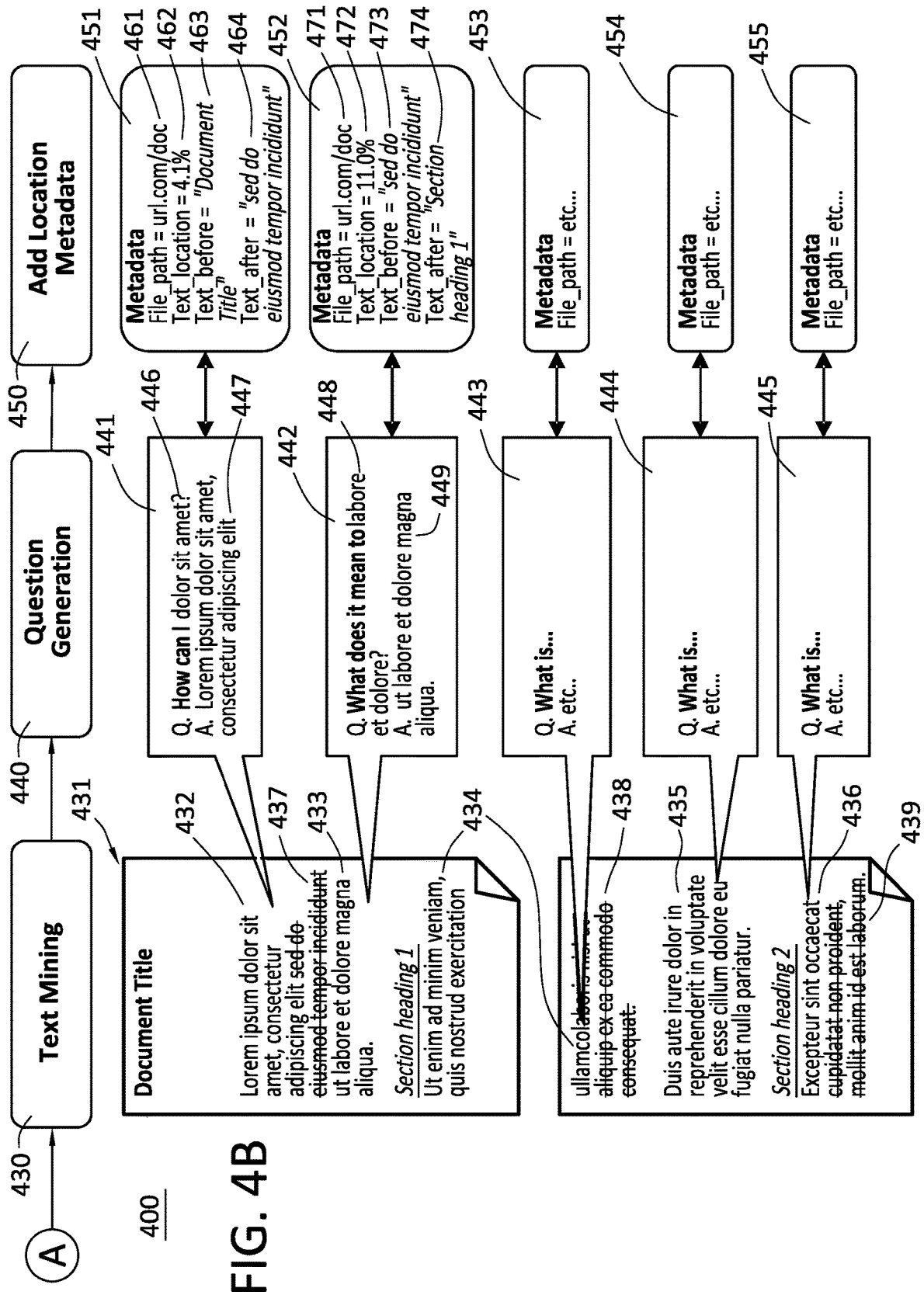

Turning ahead in the drawings, FIGS. 4A and 4B illustrate a flow chart for a method 400 of ingestion, according to an embodiment. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped.

In many embodiments, system 300 (FIG. 3), question answering system 310 (FIG. 3), and/or web server 320 (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of system 300 (FIG. 3), question answering system 310 (FIG. 3), and/or web server 320 (FIG. 3). The processor(s) can be similar or identical to the processor(s) described above with respect to computer system 100 (FIG. 1).

In some embodiments, method 400 and other blocks in method 400 can include using a distributed network including distributed memory architecture to perform the associated activity. This distributed architecture can reduce the impact on the network and system resources to reduce congestion in bottlenecks while still allowing data to be accessible from a central location.

Referring to FIG. 4A, method 400 can include a block 410 of document identification. In many embodiments, block 410 of document identification can include receiving information about content to be used when generating an index of question-answer pairs. For example, certain users (e.g., user 350 (FIG. 3)), such as a user with administrative and/or content-creation permissions, can identify one or more source documents (e.g., files, webpages, or other sources of content stored on content servers 360 (FIG. 3)) to be accessed by a question answering system (e.g., 310 (FIG. 3)). In a number of embodiments, the user can identify a source document by entering in an address of the source document, such as a server and/or file path, a URL (uniform resource locator, e.g., url.com/doc), and/or other suitable identifying and/or locating information. In some embodiments, the user can identify each source document (e.g., file or webpage) individually. In the same or other embodiments, the user can identify groups of source documents, paths of files, groups of webpages, websites, servers, parameters of source documents to be included, and/or other suitable groups of source documents to be included. In some embodiments, a web-crawler can be used to discover source documents included within an identified group (e.g., discovering webpages within an identified website).

In many embodiments, block 410 of document identification also can include loading the identified source documents in memory. For example, question answering system 310 (FIG. 3) can navigate to each of the source documents in content servers 360 (FIG. 3), and load the source document into memory in question answering system 310 (FIG. 3). The source documents can be similar to a source document 411, as shown in FIG. 4A. Source document 411 can be a multipage file that includes a first page 412 and a second page 413, and can include other pages (not shown). In other examples, the source document can be a single page and/or not include pagination. Source document 411 can include a document title 414, one or more images, such as image 415, body text 416, a first page number footer 417 on first page 412, a second page number footer 418 on second page 413, a footnote 419 on first page 412, and/or other suitable document elements. Body text 416 can include various elements, such as introductory text, a first section heading, first section text, a second section heading, second section text, and/or other suitable elements, which can span multiple pages, such as first page 412 and second page 413. With a source document (e.g., 411) loaded into memory, the source document can be processed in the ingestion process of method 400. The source documents identified each can be processed separately using the ingestion process of method 400. The source documents identified can be processed serially or in parallel. At a later time, the user and/or web crawler can identify additional source documents to be added to the set of source documents that have already been ingested into the question answering system (e.g., 310 (FIG. 3)).

In several embodiments, method 400 also can include a block 420 of pre-processing. In many embodiments, block 420 of pre-processing can include standardizing the format of the source document (e.g., 411), processing the source document (e.g., 411) to remove various document elements that are not relevant to the informational content of the source document, and/or processing the source document (e.g., 411) to isolate content of the source document that is relevant for question-answering. For example, irrelevant content elements, such as headers, page number footers, images, graphics, various formatting tags, headers, footers, captions, and/or other suitable elements, can be removed from the source document. In the same or other embodiments, pre-processing can include standardizing the format of by transforming the content, such as changing all letters to lower-case, capturing image tiles or other representations of the document as rendered on screen by a browser, and/or storing such information in memory to assist with downstream processing, as examples.

In many embodiments, block 420 of pre-processing can include receiving the source document (e.g., 411) as input and outputting a pre-processed document, such as a pre-processed document 421, as shown in FIG. 4A. Pre-processed document 421 can be similar to source document 411, but certain irrelevant document elements have been removed. For example, image 415, first page number footer 417, second page number footer 418, and footnote 419 of source document 411 can be removed during pre-processing, such that pre-processed document 421 does not include those elements. Pre-processed document 421 can include document title 414 and body text 416. Body text 416 can span multiple pages, such as first page 412 and second page 413. In some embodiments, the pagination of source document 411 can be retained in pre-processed document 421, as shown in FIG. 4A. In other embodiments, the pagination of the source document (e.g., 411), if any, can be removed during pre-processing.

In several embodiments, pre-processing of the source document (e.g., 411) to convert it into the pre-processed document (e.g., 421) can include using one or more suitable conversion utilities to convert the document into a standardized simplified text format. The one or more conversion utilities can be conventional or customized, and/or can be selected based on the type of source document. For example, Adobe PDF (Portable Document Format) files, Microsoft Word files, HTML (Hypertext Markup Language) webpages, etc., can be processed using different conversion utilities that standardize the content format into a simplified text format (e.g., plain text format), similar to the process performed to HTML documents by Markdown. In several embodiments, a headless browser can be used to render HTML webpages with their full content, such as dynamic content in a webpage that is loaded at run-time using JavaScript or other scripting languages, after which the rendered webpage can be processed to standardize the format of the content into the simplified text format. In several embodiments, an image capturing tool can be used to produce screenshots of the content and use optical character recognition (OCR) to convert it to the simplified text format. Once the source document has been converted into the simplified text format, the irrelevant document elements can be removed or transformed using a suitable processing tool, such as Readability.js, available at https://github.com/mozilla/readability, or another suitable conventional tool.

In a number of embodiments, as shown in FIG. 4B, method 400 additionally can include a block 430 of text mining. Block 430 of text mining can include receiving the pre-processed document (e.g., 421 (FIG. 4A)) as input and automatically outputting extracted content sections that can be used as answers. As an example, a mined document 431 shown in FIG. 4B can be based on pre-processed document 421 (FIG. 4A), but can show extracted content sections 432-436 and non-extracted content sections 437-439 (shown with strikethrough for illustrative purposes). A content section, which can be extracted (e.g., extracted content sections 432-436) or not extracted (e.g., non-extracted content sections 437-439), can be a section of text from the pre-processed document, and can be a portion of a sentence, a sentence, multiple sentences or portions thereof, a paragraph, multiple paragraphs or portions thereof, or other suitable portions of text. The portions of text in the extracted content sections can be extracted from the pre-processed document based on using conventional or customized machine learning algorithms trained on keywords, frequency, semantics, syntax, previously mined and labeled content, and/or other suitable features, and/or through other suitable techniques.

In many embodiments, text mining can include automatically scanning through the pre-processed document (e.g., 421 (FIG. 4A)) to subdivide and extract relevant content as the extracted content sections. Subdividing the content can include tokenizing the text at a sentence by sentence level. A machine learning algorithm (such as neural network, random forest, or another suitable algorithm) can be used to combine the sentences into groupings, and score and/or rank their relevance or importance. For example, a pre-determined and/or dynamic relevance threshold can be applied, such that the content sections (e.g., sections of text) are either extracted or not extracted, depending on the score for the content section determined by the model. The extracted content sections (e.g., 432-436) can meet or exceed the relevance threshold, and the non-extracted content sections (e.g., 437-439) do not meet the relevance threshold. The number of content sections extracted from a pre-processed document can vary depending on the content of the pre-processed document and the relevance threshold applied to the ranking score output by the model.

In some embodiments, the machine learning algorithm used in text mining can use a number of engineered features for each section of text, such as TF-IDF (term frequency-inverse document frequency) keyword rank, word frequency count, section character length, and/or sentence vector semantic similarity (e.g., using BERT (Bidirectional Encoder Representations from Transformations) vector embeddings, as described in Jacob Devlin et al., BERT: Pre-training of Deep Bidirectional Transformers for Language Understanding, 2018, available at https://arxiv.org/abs/1810.04805, or other suitable sentence embedding techniques). In other embodiments, the algorithm can use end-to-end learning based on vectorized representations of the sections. In yet other embodiments, the algorithm can use a combination of the engineered features and the end-to-end learning. The model can be trained before using it to determine the extracted content sections. The model can be trained using a dataset of documents in which the most relevant questions and answers have already been manually and/or semi-automatically mined from the documents.

In several of embodiments, method 400 further can include a block 440 of question generation. Block 440 of question generation can include using the extracted content sections (e.g., 432-436) as input and outputting question-answer pairs that are added to an index, such as in index database 316 (FIG. 3). As shown in FIG. 4B, question-answer pairs, such as question-answer pairs 441-445 can be generated based on extracted content sections, such as extracted content sections 432-436. A question-answer pair can include a question and an answer that corresponds to the question. For example, question-answer pair 441 can include a question 446 and an answer 447. Answer 447 can be similar or identical to extracted content section 432. For example, extracted content section 432 can be used as answer 447. Question 446 can be generated to correspond to answer 447, as described below in further detail. As another example, question-answer pair 442 can include a question 448 and an answer 449. Answer 449 can be similar or identical to extracted content section 433. Question 448 can be generated to correspond to answer 449, as described below in further detail. Question-answer pairs 443-445 similarly can include answers that are based on extracted content sections 434-436, respectively. Question-answer pairs 443-445 each can include a question generated based on the answer in the respective question-answer pair.

Question generation can include generating the questions based on the answers (e.g., extracted content sections), such as by using pattern-based algorithms. For example, pattern-based algorithms can include suitable heuristic rules-based algorithms or suitable machine learning models. An example of a heuristic rule would be to say "How do I+[KEYWORD_X]" where KEYWORD_X is the highest ranking keyword in the selected answer text that is a verb. An example of a machine learning model would be a generative text model that reads answers and generates associated questions, trained on open-source and/or proprietary question-answering data sets. Examples of conventional techniques are described in Qingyu Zhou et al., "Neural Question Generation from Text: A Preliminary Study," April 2017, available at https://arxiv.org/pdf/1704.01792.pdf, and Yao Zhao et al., "Paragraph-level Neural Question Generation with Maxout Pointer and Gated Self-attention Networks," Proceedings of the 2018 Conference on Empirical Methods in Natural Language Processing, Association of Computational Linguistics, Brussels, Belgium, pp. 3901-3910, Oct. 31, 2018, available at https://www.aclweb.org/anthology/D18-1424.

In many embodiments, one or more questions can be generated for each answer. For example, for some answers, multiple questions can be generated in which the answer is responsive to a question. Each of the question-answer pairs can be added to the index (e.g., in index database 316 (FIG. 3)), which can allow the question-answer pairs to be used by the question answering system (e.g., 310 (FIG. 3)) in answering questions, as described below in further detail.

In a number of embodiments, method 400 additionally can include a block 450 of adding location metadata. In several embodiments, while creating and/or adding question-answer pairs to the index, location metadata for each question-answer pair can be added to the index (e.g., index database 316 (FIG. 3)). For example, as shown in FIG. 4B, location metadata 451-455 can be generated and added to the index in association with question-answer pairs 441-445, respectively. The location metadata can include an identifier of the source document from which the answer was extracted, such as the identifier provided in block 410 (FIG. 4A) for locating the source document. For example, as shown in FIG. 4B, location metadata 451 can include a source document identifier 461. Source document identifier 461 can include a file path or URL (e.g., url.com/doc), which can identify how to access source document 411 (FIG. 4A) that was used as the source of answer 447 of question-answer pair 441. Similarly, source document identifier 471 can include a file path or URL (e.g., url.com/doc), which can identify how to access source document 411 (FIG. 4A), which was used as the source of answer 449 of question-answer pair 442. The file path or URL can be a publicly accessible address or a secure address that is privately accessible.

In many embodiments, the location metadata also can include one or more location delimiters, which can indicate a location in the source document or the pre-processed document at which the answer (e.g., the extracted content section) was found. In several embodiments, the location delimiters for an answer can include the page number of the document, the percent location within the document of the start and/or the end of the answer (e.g., the extracted content section) within the document, the preceding sentence, the subsequent sentence, and/or other suitable information that identifies the location of the answer (e.g., the extracted content section). In some embodiments, the location delimiters for an answer can include keywords in the answer, identification of formatting tags associated with the answer (e.g., bold text, etc.), or other suitable location indicators.

As an example, as shown in FIG. 4B, location metadata 451 can include a percentage location delimiter 462, which can indicate a location of a start of the text of answer 447 (e.g., extracted content section 432) within pre-processed document 421 (FIG. 4A) as a percentage of the full text within pre-processed document 421 (FIG. 4A). As shown in FIG. 4B, percentage location delimiter 462 can be 4.1%, which indicates that the text of answer 447 (e.g., extracted content section 432) begins 4.1% from the beginning of pre-processed document 421 (FIG. 4A).

As another example, as shown in FIG. 4B, location metadata 451 can include a preceding sentence delimiter 463, which can store the text of the sentence that immediately precedes the text of answer 447 (e.g., extracted content section 432) within pre-processed document 421 (FIG. 4A). As shown in FIG. 4B, preceding sentence delimiter 463 can be "Document Title," which indicates that the text of answer 447 (e.g., extracted content section 432) within pre-processed document 421 (FIG. 4A) begins immediately after the text "Document Title."

As yet another example, as shown in FIG. 4B, location metadata 451 can include a subsequent sentence delimiter 464, which can store the text of the sentence that immediately follows the text of answer 447 (e.g., extracted content section 432) within pre-processed document 421 (FIG. 4A). As shown in FIG. 4B, subsequent sentence delimiter 464 can be "sed do eiusmod tempor incididunt," which indicates that the text of answer 447 (e.g., extracted content section 432) within pre-processed document 421 (FIG. 4A) ends immediately before the text "sed do eiusmod tempor incididunt."

In many embodiments, source document identifier 461 and each of the location delimiters (e.g., 462-464) of location metadata 451 can be stored in the index (e.g., index database 316 (FIG. 3)). Location metadata 451 can be associated with question-answer pair 441 in the index.

Similarly, location metadata 452 can include a percentage location delimiter 472, which can be similar to percentage location delimiter 462, and which can indicate a location of a start of the text of answer 449 (e.g., extracted content section 433) within pre-processed document 421 (FIG. 4A) as a percentage of the full text within pre-processed document 421 (FIG. 4A). Location metadata 452 also can include a preceding sentence delimiter 473, which can be similar to preceding sentence delimiter 463, and which can store the text of the sentence that precedes the text of answer 449 (e.g., extracted content section 433) within pre-processed document 421 (FIG. 4A). Location metadata 451 additionally can include a subsequent sentence delimiter 474, which can be similar to subsequent sentence delimiter 464, and which can store the text of the sentence that follows the text of answer 449 (e.g., extracted content section 433) within pre-processed document 421 (FIG. 4A). Location metadata 453-455 similarly can include source document identifiers and location delimiters for the answers in question-answer pairs 443-445, respectively. The location metadata (e.g., 451-455) can be used later in retrieving the answer from the source document (e.g., 411 (FIG. 4A)), and can handle updates to the source document, as described below in further detail. In many embodiments, full versions of the source document (e.g., 411 (FIG. 4A)) and/or the pre-processed document (e.g., 421 (FIG. 4A)) are not stored or cached in the index (e.g., index database 316 (FIG. 3)).

Figure 5A:
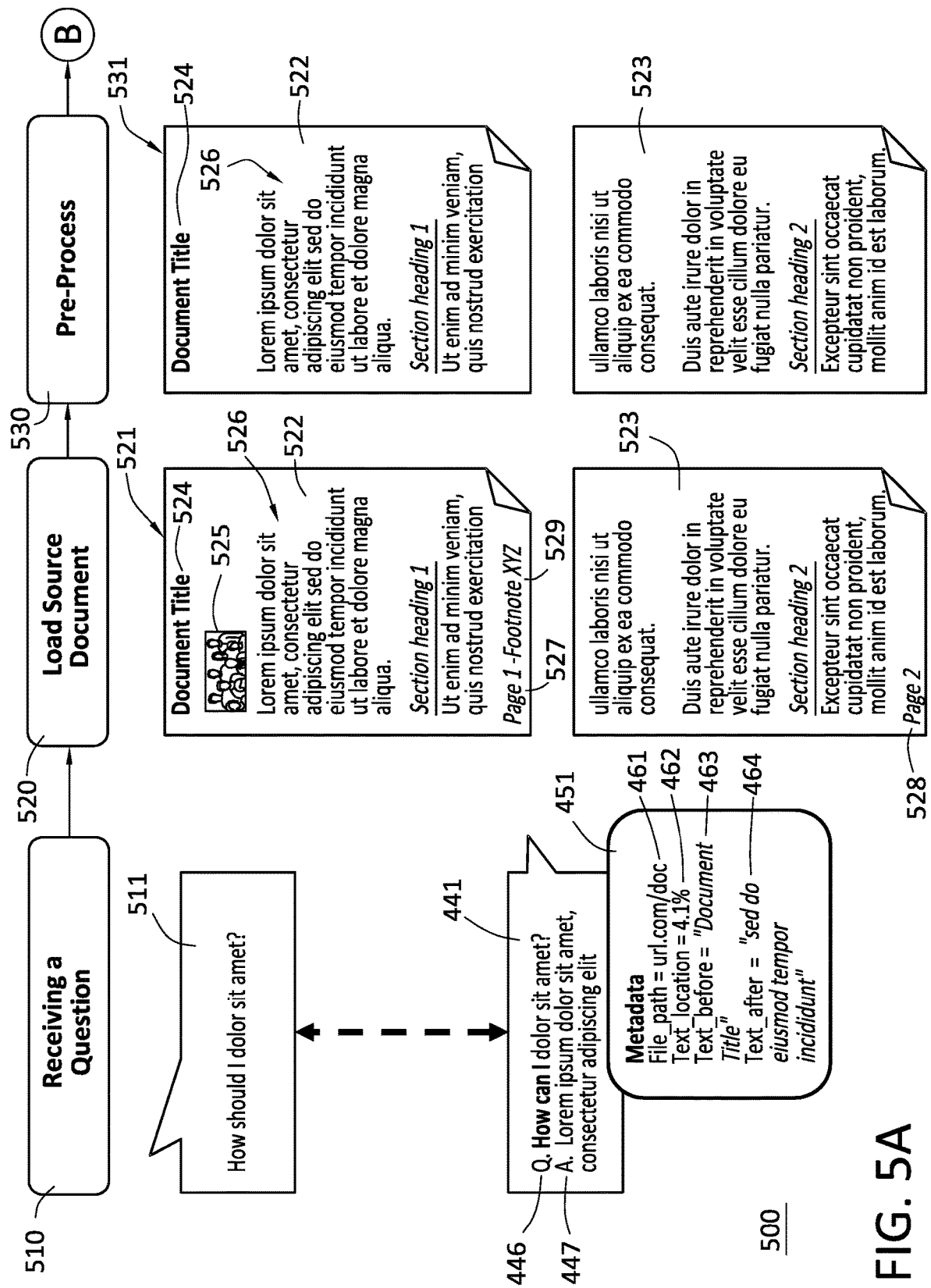
FIGS. 5A and 5B illustrate a flow chart for a method of retrieval and presentment, according to an embodiment.
Figure 5B:
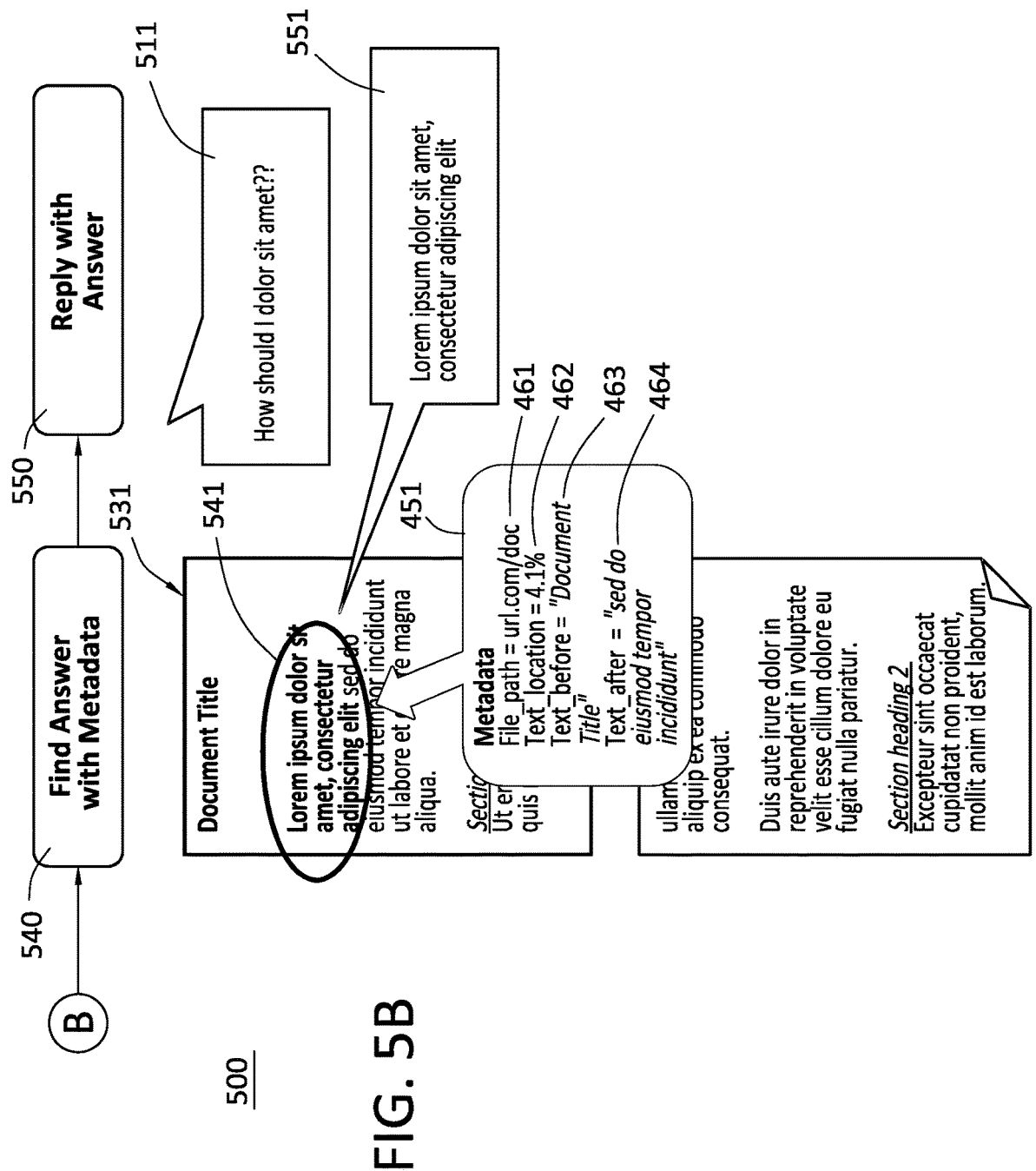

Turning ahead in the drawings, FIGS. 5A and 5B illustrate a flow chart for a method 500 of retrieval and presentment, according to an embodiment. Method 500 is merely exemplary and is not limited to the embodiments presented herein. Method 500 can be employed in many different embodiments or examples not specifically depicted or described herein. In some embodiments, the procedures, the processes, and/or the activities of method 500 can be performed in the order presented. In other embodiments, the procedures, the processes, and/or the activities of method 500 can be performed in any suitable order. In still other embodiments, one or more of the procedures, the processes, and/or the activities of method 500 can be combined or skipped. In many embodiments, method 500 can be performed any number of times after method 400 (FIGS. 4A and 4B) is performed.

In many embodiments, system 300 (FIG. 3), question answering system 310 (FIG. 3), and/or web server 320 (FIG. 3) can be suitable to perform method 500 and/or one or more of the activities of method 500. In these or other embodiments, one or more of the activities of method 500 can be implemented as one or more computing instructions configured to run at one or more processors and configured to be stored at one or more non-transitory computer readable media. Such non-transitory computer readable media can be part of system 300 (FIG. 3), question answering system 310 (FIG. 3), and/or web server 320 (FIG. 3). The processor(s) can be similar or identical to the processor(s) described above with respect to computer system 100 (FIG. 1).

In some embodiments, method 500 and other blocks in method 500 can include using a distributed network including distributed memory architecture to perform the associated activity. This distributed architecture can reduce the impact on the network and system resources to reduce congestion in bottlenecks while still allowing data to be accessible from a central location.

Referring to FIG. 5A, method 500 can include a block 510 of receiving a question. In many embodiments, the question can be received through a chat agent, such as chat agent 321 (FIG. 3), from a user, such as user 350 (FIG. 3). The user can be a user of the chat agent and need not be a user with administrative and/or content-creation permissions. The question can be received from the chat agent through an API (application programming interface) or another suitable form of communication. For example, as shown in FIG. 5A, a question 511 can be received, which can be "How should I dolor sit amet?" Block 510 of receiving a question also can include matching the question (e.g., 511) to a question-answer pair stored in the index (e.g., index database 316 (FIG. 3)). For example, as shown in FIG. 5A, question 511 can be matched with question-answer pair 441, which is stored in the index in association with location metadata 451. The question received can be matched to a question-answer pair, even if the question received does not exactly match, word-for-word, the question stored in the question-answer pair. For example, question 511 can be matched to question-answer pair 441, even though question 511 (i.e., "How should I dolor sit amet?") does not exactly match, word-for-word, question 446 stored in question-answer pair 441 (i.e., "How can I dolor sit amet?").

The question received can be matched to a question of a question-answer pair stored in the index using one or more conventional natural language understanding algorithms, such as using intent classification with keyword matching, word vector similarity, sentence vector similarity, or another suitable algorithm. For example, an ensemble machine learning model can be trained with various features for intent matching, and can be used to match the question received to one of the questions of the question-answer pairs stored in the index.

In several embodiments, method 500 also can include a block 520 of loading a current version of the source document. The source document identifier (e.g., 461) of the location metadata (e.g., 451) associated with the question-answer pair (e.g., 441) that matched the question received (e.g., question 511) can be used to retrieve a current version of the source document, such as from content servers 360 (FIG. 3). As shown in FIG. 5A, a source document 521 can be retrieved and loaded into memory, based on source document identifier 461. Source document 521 can be similar or identical to source document 411 (FIG. 4A), and can be a current or updated version of source document 411 (FIG. 4A). If source document 411 (FIG. 4A) has not changed since it was used to generate question-answer pair 441, then source document 521 can be identical to source document 411 (FIG. 4A), but if source document 411 was modified, updated, overwritten, etc., then the current version of the source document, source document 521, can be different from source document 411.

As shown in FIG. 5A, source document 521 can be a multipage file that includes a first page 522 and a second page 523, and can include other pages (not shown). Source document 521 can include a document title 524, one or more images, such as image 525, body text 526, a first page number footer 527 on first page 522, a second page number footer 528 on second page 523, a footnote 529 on first page 522, and/or other suitable document elements. These elements can be similar or identical to the corresponding elements of source document 411 (FIG. 4A).

In a number of embodiments, method 500 additionally can include a block 530 of pre-processing. In many embodiments, block 530 of pre-processing can be similar or identical to block 420 (FIG. 4A) of pre-processing. The pre-processing can include standardizing the format of the source document (e.g., 521), processing the source document (e.g., 521) to remove various document elements that are not relevant to the informational content of the source document, and/or processing the source document (e.g., 521) to isolate content of the source document that is relevant for question-answering. For example, as described above in block 420 (FIG. 4A) of pre-processing, irrelevant content elements, such as headers, page number footers, images, graphics, various formatting tags, headers, footers, captions, and/or other suitable elements, can be removed from the source document. In the same or other embodiments, pre-processing can include standardizing the format of by transforming the content, such as changing all letters to lower-case, capturing image tiles or other representations of the document as rendered on screen by a browser, and/or storing such information in memory to assist with downstream processing, as examples.

In many embodiments, block 530 of pre-processing can include receiving the source document (e.g., 521) as input and outputting a pre-processed document, such as pre-processed document 531. Pre-processed document 531 can be similar or identical to pre-processed document 421 (FIG. 4A), depending on differences between source document 521 and source document 411 (FIG. 4A). As shown in FIG. 5A, pre-processed document 531 can be similar to source document 521, but certain document elements can be removed. For example, image 525, first page number footer 527, second page number footer 528, and footnote 529 of source document 521 can be removed during process, such that pre-processed document 531 does not include those elements. Pre-processed document 531 can include document title 524 and body text 526. Body text 526 can span multiple pages, such as first page 522 and second page 523.

In several embodiments, as shown in FIG. 5B, method 500 further can include a block 540 of finding an answer using location metadata. In many embodiments, the location delimiters of the location metadata can be used to retrieve answer text from the pre-processed document. For example, as shown in FIG. 5B, location delimiters 462-464 of location metadata 451 can be used to located answer text 541 in pre-processed document 531. Answer text 541 can be similar or identical to answer 447. If source document 521 (FIG. 5A) is identical to source document 411 (FIG. 4A), answer text 541 can be identical to answer 447. When source document 521 (FIG. 5A) is different from source document 411 (FIG. 4A), such as source document 521 (FIG. 5A) being based on updates to source document 411 (FIG. 4A), answer text 541 can be the same as or different from answer 447. Answer text 541 can be a fresh answer based on the current version of the source document (e.g., 521 (FIG. 5A)), which can be different from answer 447, as answer 447 can become outdated and stale due to changes to the source document (e.g., 521 (FIG. 5A)).

For example, an original source document (e.g., 411) could have included the text, "Contact Mary Jones when XYZ happens," which could have been stored as an answer in a question-answer pair, after which the source document was updated. The updated source document (e.g., 521 (FIG. 5A)) could have been updated to include the text, "Contact Jim Smith when XYZ happens," but this can be on the same page in the current version of the source document as the earlier text was in the original version of the source document, and the preceding and subsequent sentences can be the same as well. The answer text (e.g., 541) can be determined to be the updated text, "Contact Jim Smith when XYZ happens," based on an analysis of the location delimiters.

One or more of the location delimiters (e.g., 462-464) can be used in any suitable technique to determine the answer text (e.g., 541). In many embodiments, the answer (e.g., 447) stored in the question-answer pair (e.g., 441) also can be used in one or more of these techniques to determine the answer text (e.g., 541). In other embodiments, the answer (e.g., 447) stored in the question-answer pair (e.g., 441) is not used to determine the answer text (e.g., 541). For example, the techniques can include searching for text in the pre-processed document (e.g., 531) that matches the location delimiters (e.g., 562-564). The techniques can include using exact string searches and/or looking for partial matches with fuzzy search (e.g., approximate string matching) and/or regular expressions. Match scores can be derived for such partial matches. Partial matches above a pre-determined threshold score or tolerance can be relevant in case some of the surrounding content in the current version of the pre-processed document (e.g., 531) has been updated or edited from the original pre-processed document (e.g., 421 (FIG. 4A)). In some embodiments, the cached, static version of the answer (e.g., 447) stored in the question-answer pair (e.g., 441) can be used as the answer text, as a backup approach if retrieval of the answer text is unsuccessful (e.g., all match scores are below the threshold). In certain such embodiments, the answer text can be flagged as being potentially outdated. In other certain such embodiments, the answer text is used without such flagging.

In some embodiments, when source document has changed, when answer text 541 is not identical to answer 447, and/or when the location of answer text 541 is different from the location indicated by one or more of the location delimiters (e.g., 462-464), answer 447 can be updated to match answer text 541, question 446 can be updated to be based on answer text 541, and/or the location delimiters (e.g., 452-454) can be updated to indicate that location of answer text 541 in pre-processed document 531. In other embodiments, question-answer pair 441 and/or location metadata 451 are not updated.

In a number of embodiments, method 500 additionally can include a block 550 of replying with the answer. Once the answer text (e.g., 541) has been identified, the answer text (e.g., 541) can be used in an answer 551 that is sent to the user (e.g., 350 (FIG. 3)), to respond to the question received in block 510 (FIG. 5A) (e.g., question 511 (FIG. 5A)). In many embodiments, the answer (e.g., 551) can be sent through an API to the chat agent (e.g., 321 (FIG. 3)). In many embodiments, the answer (e.g., 551) can be sent in real-time after receiving the question (e.g., 511 (FIG. 5A)) in block 510 (FIG. 5A), such that method 500 is processed in real-time. In many embodiments, the answer (e.g., 551) can be a current, update-to-date portion of a source document. In some embodiments, the source document identifier (e.g., 461) can be included with the answer (e.g., 551), so the user can access the full, current source document.

Figure 6A:
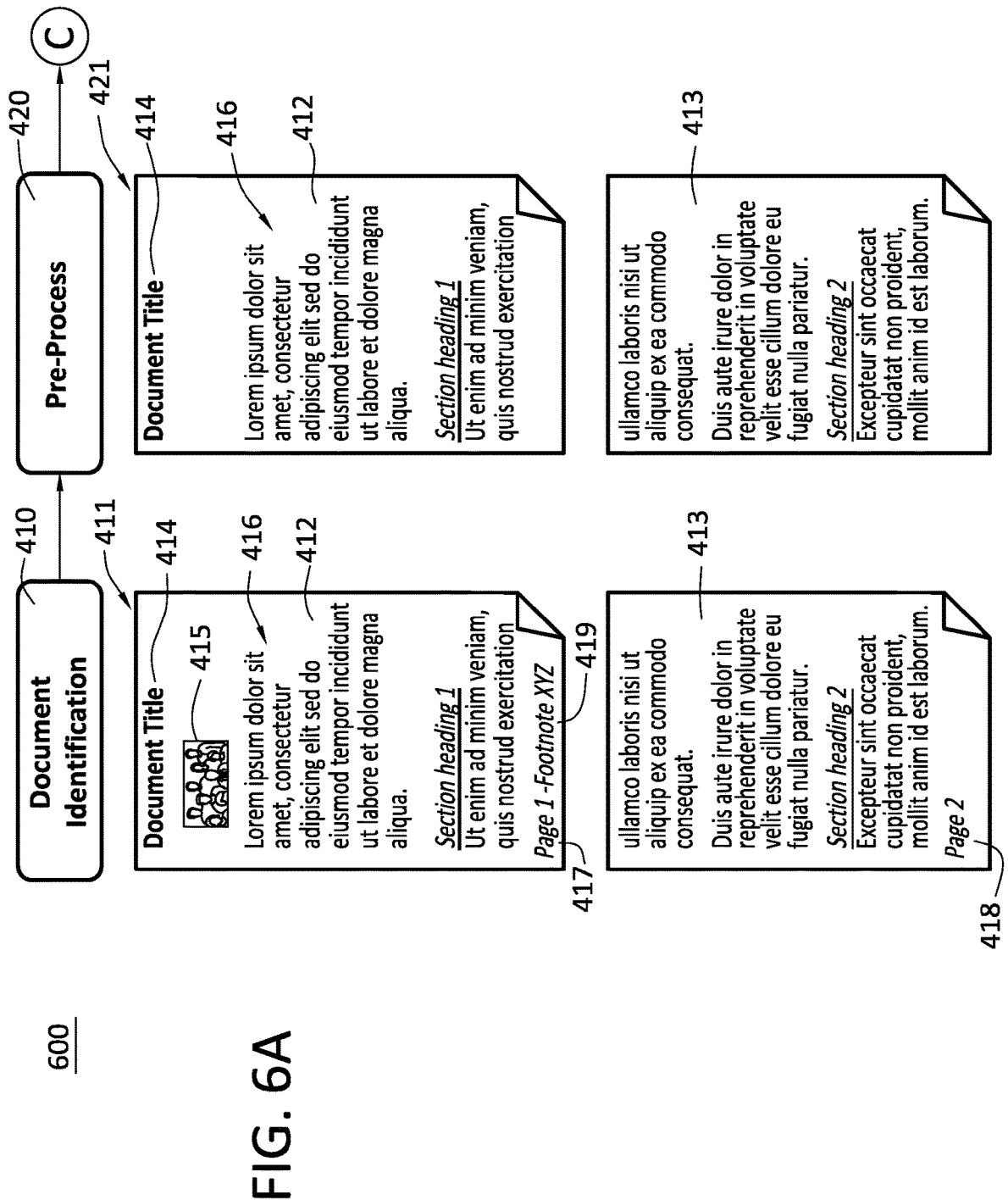
FIGS. 6A and 6B illustrate a flow chart for a method of ingestion with enhanced security, according to an embodiment.
Figure 6B:
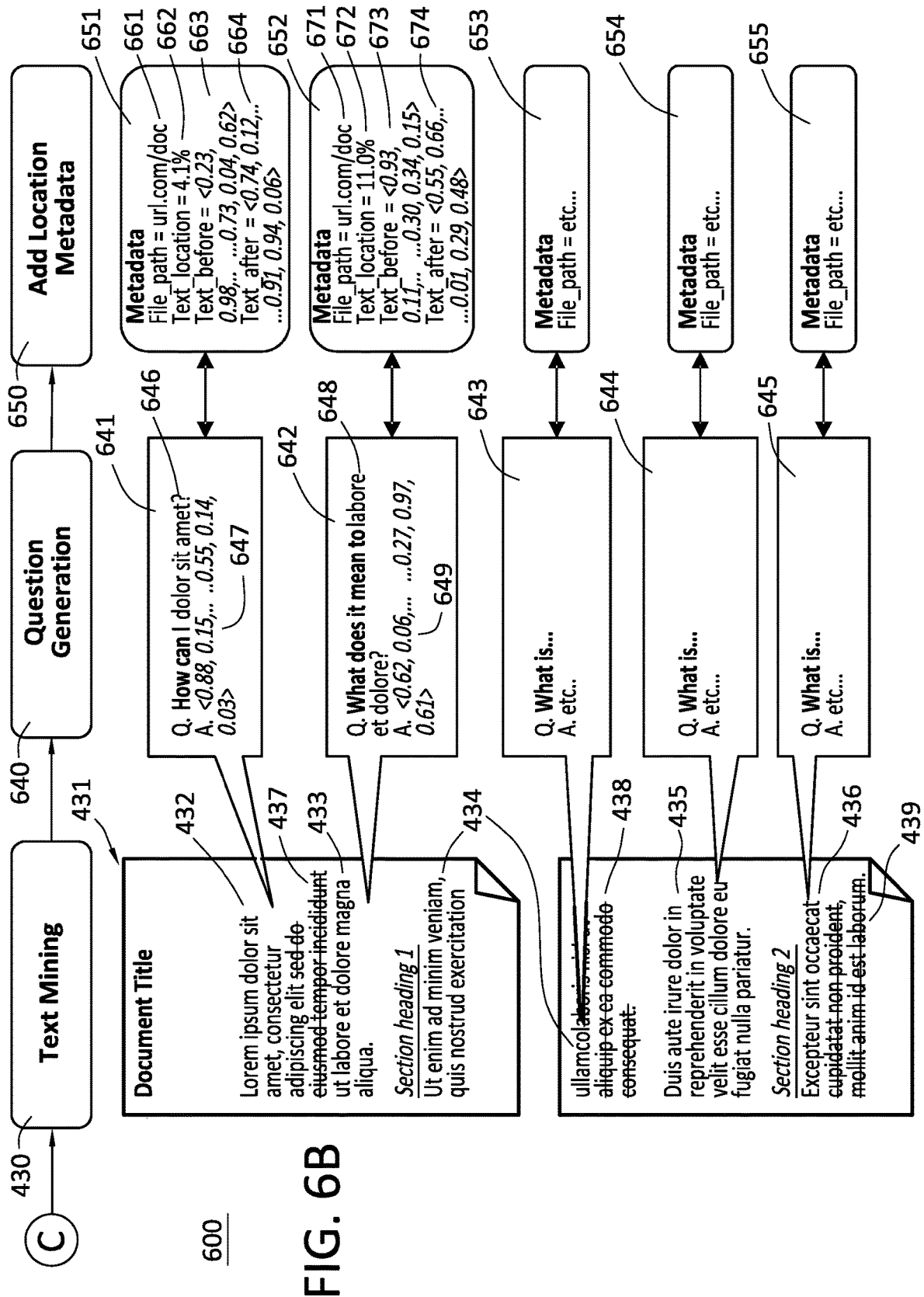

Turning ahead in the drawings, FIGS. 6A and 6B illustrate a flow chart for a method 600 of ingestion with enhanced security, according to an embodiment. Method 600 is merely exemplary and is not limited to the embodiments presented herein. Method 600 can be employed in many different embodiments or examples not specifically depicted or described herein. In some embodiments, the procedures, the processes, and/or the activities of method 600 can be performed in the order presented. In other embodiments, the procedures, the processes, and/or the activities of method 600 can be performed in any suitable order. In still other embodiments, one or more of the procedures, the processes, and/or the activities of method 600 can be combined or skipped.

In many embodiments, system 300 (FIG. 3), question answering system 310 (FIG. 3), and/or web server 320 (FIG. 3) can be suitable to perform method 600 and/or one or more of the activities of method 600. In these or other embodiments, one or more of the activities of method 600 can be implemented as one or more computing instructions configured to run at one or more processors and configured to be stored at one or more non-transitory computer readable media. Such non-transitory computer readable media can be part of system 300 (FIG. 3), question answering system 310 (FIG. 3), and/or web server 320 (FIG. 3). The processor(s) can be similar or identical to the processor(s) described above with respect to computer system 100 (FIG. 1).

In some embodiments, method 600 and other blocks in method 600 can include using a distributed network including distributed memory architecture to perform the associated activity. This distributed architecture can reduce the impact on the network and system resources to reduce congestion in bottlenecks while still allowing data to be accessible from a central location.

Referring to FIGS. 6A and 6B, method 600 can be similar to method 400 (FIGS. 4A and 4B), but with various differences. Specifically, as shown in FIGS. 6A and 6B, method 600 can include block 410 of document identification, block 420 of pre-processing, and block 430 of text mining, as described above in method 400 (FIGS. 4A and 4B). Instead of block 440 (FIG. 4B) and block 450 (FIG. 4B), method 600 can include a block 640 of question generation and a block 650 of adding location metadata, respectively. In many embodiments, method 600 can provide security enhancements, such as not storing text from source documents in a human-readable text format.

In several of embodiments, as shown in FIG. 6B, block 640 of question generation can be similar to block 440 (FIG. 4B) of question generation, but with various differences. Similar to block 440 (FIG. 4B) of question generation, block 640 of question generation can include using the extracted content sections (e.g., 432-436) as input and outputting question-answer pairs that are added to an index, such as in index database 316 (FIG. 3). As shown in FIG. 6B, question-answer pairs, such as question-answer pairs 641-645 can be generated based on extracted content sections, such as extracted content sections 432-436. Question-answer pairs 641-645 can be similar to question-answer pairs 441-445 (FIG. 4B). Question-answer pair 641 can include a question 646 and a transformed answer 647. Question 646 can be similar or identical to question 446 (FIG. 4B), and can be generated to correspond to extracted content section 432, as described above in connection with block 440 (FIG. 4B). Transformed answer 647 can be saved instead of answer 447 (FIG. 4B) to provide enhanced security. In other embodiments, the question-answer pairs (e.g., 641-645) include a question (e.g., 646), but do not include an answer or a transformed answer.

As another example, question-answer pair 642 can include a question 648 and a transformed answer 649. Question 648 can be generated to correspond to extracted content section 433. Question-answer pairs 443-445 similarly can include transformed answers that are based on extracted content sections 434-436, respectively. Question-answer pairs 443-445 each can include a question generated based on extracted content sections 434-436, respectively. In many embodiments, each of the question-answer pairs can be added to the index (e.g., index database 316 (FIG. 3)), which can allow the question-answer pairs to be used by the question answering system (e.g., 310 (FIG. 3)) in answering questions. In many embodiments, the questions are not transformed, as the questions are not considered to pose a security risk because the sensitive information is found in the answers. In such embodiments, the questions can be indexed in the question-answer pairs in human-readable text form, as described above. In other embodiments, the questions can be transformed in addition to the answers.

The transformed answer (e.g., 647, 649) can be generated based on the associated extracted content section (e.g., 432, 433, respectively), but can be transformed so as to not be in a human-readable text format. In many embodiments, the extracted content section (e.g., 432, 433) can be transformed into vector embeddings using a suitable machine learning-based transformation algorithm. For example, the transformation algorithm can take passages, sentences, words, or portions of words as input and produce a vector string of numbers of length N (typically between 50 and 1000, depending on the application), which can store an N-dimensional representation of the model's learned meanings and relationships. Examples of suitable transformation algorithms can include neural network approaches such as Universal Sentence Encoder and BERT, both developed by Google LLC of Mountain View, Calif. In many embodiments, the vector representation of the answer, as stored in the transformed answer (e.g., 647, 649) can advantageously facilitate finding the updated, fresh version of the answer from the updated source document, as described below.

In general, a transformed answer generated using such a transformation algorithm can be unreadable to humans and can be difficult to decode or reverse engineer. However, if the training data and/or models become available to those attempting to decode the transformed answer, reverse engineering the transformed answer can be more readily accomplished. Use of unique vector transformations that are kept secret, based on customized models, vector sizes, and/or unique training data, can mitigate such risk. If further security is desired, additional transforms can be applied to the vector output of the transformation algorithm. For example, a cryptographic hashing algorithm and/or conventional encryption can be applied to the vector output.

In a number of embodiments, block 650 of adding location metadata can be similar to block 450 (FIG. 4B) of adding location metadata, but with various differences. Similar to block 450 (FIG. 4B) of adding location metadata, block 650 of adding location metadata can include adding location metadata to the index (e.g., index database 316 (FIG. 3)) for each question-answer pair that is added to the index. For example, as shown in FIG. 6B, location metadata 651-655 can be generated and added to the index in associated with question-answer pairs 641-645, respectively. Location metadata 651-655 can be similar to location metadata 451-455, but with various differences. Specifically, in many embodiments, text from the source document (e.g., 411 (FIG. 6A), 421 (FIG. 6A), 431 (FIG. 6B)) can be transformed to not be in a human-readable text format, which can include transforming one or more of the location delimiters.

As shown in FIG. 6B, location metadata 651 can include a source document identifier 661 and one or more location delimiters (e.g., 662-664). Source document identifier 661 can be similar or identical to source document identifier 461 (FIG. 4B), and can identify how to access source document 411 (FIG. 6A). As shown in FIG. 6B, location metadata 651 can include a percentage location delimiter 662, a transformed preceding sentence delimiter 663, and/or a transformed subsequent sentence delimiter 664. In other embodiments, other or additional location delimiters can be included in the location metadata. Percentage location delimiter 662 can be similar or identical to percentage location delimiter 462 (FIG. 4B), transformed preceding sentence delimiter 663 can be similar to preceding sentence delimiter 463 (FIG. 4B), and/or transformed subsequent sentence delimiter 664 can be similar to subsequent sentence delimiter 464 (FIG. 4B). Because preceding sentence delimiter 463 (FIG. 4B) and subsequent sentence delimiter 464 (FIG. 4B) include text from the source document, such text can be transformed to not be in a human-readable text format when stored in in transformed preceding sentence delimiter 663 and transformed subsequent sentence delimiter 664.

As an example, the preceding sentence of "Document Title" can be transformed using a transformation algorithm, as described above, into a vector representation, such as <0.23, 0.98, . . . 0.73, 0.04, 0.62>, which can be stored in transformed preceding sentence delimiter 663. Similarly, the subsequent sentence of "sed do eiusmod tempor incididunt" can be transformed using a transformation algorithm, as described above, into a vector representation, such as <0.74, 0.12, . . . 0.91, 0.94, 0.06>, which can be stored in transformed subsequent sentence delimiter 664. In many embodiments, source document identifier 661 and each of the location delimiters (e.g., 662-664) of location metadata 651 can be stored in the index (e.g., in index database 316 (FIG. 3)). Location metadata 651 can be associated with question-answer pair 641 in the index. For illustrative purposes, Table 1 below shows an example of differences between entries for a baseline approach of ingestion using method 400 (FIGS. 4A and 4B), which generates question-answer pair 441 (FIG. 4B) and associated location metadata 451 (FIG. 4B) as exemplary associated index entries, and an enhanced security approach of ingestion using method 600, which generates question-answer pair 641 (FIG. 6B) and associated location metadata 651 (FIG. 6B) as exemplary associated index entries.

TABLE 1

| Baseline Index Entries | Enhanced Security Index Entries |
| --- | --- |
| Question-Answer Pair (441) | Question-Answer Pair (641) |
| Question: How can I dolor sit amet? | Question: How can I dolor sit amet? |
| Static Cached Answer: Lorem ipsum dolor sit amet, consectetur adipiscing elit | Static Cached Answer: <0.88, 0.15, . . . 0.55, 0.14, 0.03> |
| Location Metadata (451) | Location Metadata (651) |
| File_path = url.com/doc | File_path = url.com/doc |
| Text_location = 4.1% | Text_location = 4.1% |
| Text_before = "Document Title" | Text_before = <0.23, 0.98, . . . 0.73, 0.04, 0.62> |
| Text_after = "sed do eiusmod tempor incididunt" | Text_after = <0.74, 0.12, . . . 0.91, 0.94, 0.06> |

Similarly, location metadata 652 can include a source document identifier 671 and one or more location delimiters (e.g., 672-674). As shown in FIG. 6B, location metadata 652 can include a percentage location delimiter 672, a transformed preceding sentence delimiter 673, and/or a transformed subsequent sentence delimiter 674. Percentage location delimiter 672 can be similar or identical to percentage location delimiter 472 (FIG. 4B), transformed preceding sentence delimiter 673 can be similar to transformed preceding sentence delimiter 473 (FIG. 4B), and/or transformed subsequent sentence delimiter 674 can be similar to subsequent sentence delimiter 474 (FIG. 4B). In transformed preceding sentence delimiter 673 and transformed subsequent sentence delimiter 674, the text can be transformed into a non-human readable format. Location metadata 653-655 similarly can include source document identifiers and location delimiters for the answers in question-answer pairs 643-645, respectively. The location metadata (e.g., 651-655) can be used later in retrieving the answer from the source document (e.g., 411 (FIG. 6A)), and can handle updates to the source document. In many embodiments, full versions of the source document (e.g., 411 (FIG. 6A)) and/or the pre-processed document (e.g., 421 (FIG. 6A)) are not stored or cached in the index (e.g., index database 316 (FIG. 3)).

Turning ahead in the drawings, FIGS. 7A and 7B illustrate a flow chart for a method 700 of retrieval and presentment with enhanced security, according to an embodiment. Method 700 is merely exemplary and is not limited to the embodiments presented herein. Method 700 can be employed in many different embodiments or examples not specifically depicted or described herein. In some embodiments, the procedures, the processes, and/or the activities of method 700 can be performed in the order presented. In other embodiments, the procedures, the processes, and/or the activities of method 700 can be performed in any suitable order. In still other embodiments, one or more of the procedures, the processes, and/or the activities of method 700 can be combined or skipped. In many embodiments, method 700 can be performed any number of times after method 600 (FIGS. 6A and 6B) is performed.

In many embodiments, system 300 (FIG. 3), question answering system 310 (FIG. 3), and/or web server 320 (FIG. 3) can be suitable to perform method 700 and/or one or more of the activities of method 700. In these or other embodiments, one or more of the activities of method 700 can be implemented as one or more computing instructions configured to run at one or more processors and configured to be stored at one or more non-transitory computer readable media. Such non-transitory computer readable media can be part of system 300 (FIG. 3), question answering system 310 (FIG. 3), and/or web server 320 (FIG. 3). The processor(s) can be similar or identical to the processor(s) described above with respect to computer system 100 (FIG. 1).

In some embodiments, method 700 and other blocks in method 700 can include using a distributed network including distributed memory architecture to perform the associated activity. This distributed architecture can reduce the impact on the network and system resources to reduce congestion in bottlenecks while still allowing data to be accessible from a central location.

Referring to FIGS. 7A and 7B, method 700 can be similar to method 500 (FIGS. 5A and 5B), but with various differences. Specifically, method 700 can include block 520 of loading a current version of the source document and block 550 of replying with the answer, as described above in method 500 (FIGS. 5A and 5B). Instead of block 510 (FIG. 5A) of receiving a question, block 530 (FIG. 5A) of pre-processing, and block 540 (FIG. 5B) of finding an answer using location meta, method 700 can include a block 710 of receiving a question, a block 730 of pre-processing, and a block 740 of finding an answer using location metadata, respectively. In many embodiments, method 700 can provide security enhancements, such as being able to handle transformed data instead of relying on text from source documents stored in a human-readable text format.

In many embodiments, as shown in FIG. 7A, block 710 of receiving a question can be similar to block 510 (FIG. 5A) of receiving a question. Similar to block 510 (FIG. 5A) of receiving a question, block 710 of receiving a question can include receiving a question, such as question 511, as described above. Block 710 of receiving a question also can include matching the question (e.g., 511) to a question-answer pair stored in the index (e.g., index database 316 (FIG. 3)). For example, as shown in FIG. 7A, question 511 can be matched with question-answer pair 641, which is stored in the index in association with location metadata 651. The question received can be matched to a question-answer pair as described above.

In block 520 of loading a current version of the source document, the source document identifier (e.g., 661) of the location metadata (e.g., 651) associated with the question-answer pair (e.g., 641) that matched the question received (e.g., question 511) can be used to retrieve a current version of the source document (e.g., 521), as described above.

After block 520, method 700 can proceed with block 730 of pre-processing. Block 730 of pre-processing can be similar to block 530 (FIG. 5A), which can include processing the source document (e.g., 521) to output the pre-processed document (e.g., 531). In addition, in some embodiments, block 730 can include transforming the entirety of the pre-processed document (e.g., 531) into vector embeddings (not shown) using the same transformation algorithm as used in the processes described above for generating the transformed answer in connection with block 640 (FIG. 6B) and generating the transformed location delimiters in connection with block 650 (FIG. 6B).

After performing block 730 of pre-processing, method 700 can perform block 740 of finding an answer using location metadata, as shown in FIG. 7B. Block 740 of finding an answer using location metadata can be similar or identical to block 540 (FIG. 5B) of finding an answer using location metadata, but with various differences, based on the different location metadata (e.g., 651). The location delimiters of the location metadata can be used to retrieve answer text from the pre-processed document. For example, as shown in FIG. 7B, location delimiters 662-664 of location metadata 651 can be used to locate answer text 541 in pre-processed document 531. Answer text 541 can be similar to transformed answer 647, but can be a version that is in human-readable text format. Answer text 541 can be based on the current version of the source document (e.g., 521 (FIG. 7A)), which can be different from the answer that is represented by transformed answer 647, as the answer represented by transformed answer 647 can become outdated and stale due to changes to the source document (e.g., 521 (FIG. 7A)).

One or more of the location delimiters (e.g., 662-664) can be used in any suitable technique to determine the answer text (e.g., 541). In many embodiments, the vector embeddings of the pre-processed document (e.g., 531) can be searched and ranked by similarity (e.g., approximate string matching) with the location delimiters (e.g., 662-664) and/or the transformed answer (e.g., 647) using a suitable similarity measure, such as cosine similarity or Manhattan distance. For example, similarity scores can be generated for the portions of the vector embeddings of the pre-processed document (e.g., 531), and the highest ranked portion can be identified as the matching representation. The matching representation can thus be located using the vector representations rather than human-readable text data. The vector representation of the data (e.g., the vector representations of the transformed answer (e.g., 647, 649), the vector representations of one or more of the location delimiters (e.g., 663-664, 673-674), and the vector representations of the pre-processed document (e.g., 531)) can assist in finding the matching representation, as the vector representations can be generated to represent suitable similarity features by machine learning algorithms, as described above. Once the matching representation is determined, the answer text (e.g., 541) can be retrieved from source document based on the location of the matching representation within the vector embeddings of the processed document (e.g., 531). Alternatively, in some embodiments, the matching representation can be transformed from the vector representation into a human-readable text format to determine the answer text (e.g., 541) in pre-processed document 531.

After block 740 of finding an answer using location metadata, method 700 can proceed with block 550 of replying with the answer. As described above, the answer text (e.g., 541) can be used in answer 551 that is sent to the user. In many embodiments, the answer (e.g., 551) can be sent in real-time after receiving the question (e.g., 511) in block 710 (FIG. 7A), such that method 700 is processed in real-time.

Turning ahead in the drawings, FIG. 8 illustrates a flow chart for a method 800 of ingestion and retrieval of dynamic source documents in an automated question answering system, according to an embodiment. Method 800 is merely exemplary and is not limited to the embodiments presented herein. Method 800 can be employed in many different embodiments or examples not specifically depicted or described herein. In some embodiments, the procedures, the processes, and/or the activities of method 800 can be performed in the order presented. In other embodiments, the procedures, the processes, and/or the activities of method 800 can be performed in any suitable order. In still other embodiments, one or more of the procedures, the processes, and/or the activities of method 800 can be combined or skipped.

In many embodiments, system 300 (FIG. 3), question answering system 310 (FIG. 3), and/or web server 320 (FIG. 3) can be suitable to perform method 800 and/or one or more of the activities of method 800. In these or other embodiments, one or more of the activities of method 800 can be implemented as one or more computing instructions configured to run at one or more processors and configured to be stored at one or more non-transitory computer readable media. Such non-transitory computer readable media can be part of system 300 (FIG. 3), question answering system 310 (FIG. 3), and/or web server 320 (FIG. 3). The processor(s) can be similar or identical to the processor(s) described above with respect to computer system 100 (FIG. 1).

In some embodiments, method 800 and other blocks in method 800 can include using a distributed network including distributed memory architecture to perform the associated activity. This distributed architecture can reduce the impact on the network and system resources to reduce congestion in bottlenecks while still allowing data to be accessible from a central location.

Referring to FIG. 8, method 800 can include a block 810 of generating an index comprising (a) question-answer pairs generated based at least in part on a set of ingested source documents and (b) respective location metadata associated with each of the question-answer pairs. The index can be similar or identical to the index stored in database 316 (FIG. 3). The set of ingested source documents can be a set of source documents identified for ingestion, as described above in block 410 (FIGS. 4A, 4B). The set of ingested source documents can be similar or identical to source document 411 (FIGS. 4A, 6A). The question-answer pairs can be similar or identical to question-answer pairs 441-445 (FIG. 4B) and/or question-answer pairs 641-645 (FIG. 6B). The location metadata can be similar or identical to location metadata 451-455 (FIG. 4B) and/or location metadata 651-655 (FIG. 6B). The respective location metadata associated with each of the question-answer pairs can include a source document identifier of a first ingested source document of the set of ingested source documents and one or more location delimiters indicating a location of target text in the first ingested source document. The first ingested source document can be similar or identical to source document 411 (FIGS. 4A, 6A). The source document identifier can be similar or identical to source document identifier 461 (FIG. 4B), source document identifier 471 (FIG. 4B), source document identifier 661 (FIG. 6B), and/or source document identifier 671 (FIG. 6B). The one or more location delimiters can be similar or identical to location delimiters 462-464 (FIG. 4B), 472-474 (FIG. 4B), 662-664 (FIG. 6B), and/or 672-674 (FIG. 6B). In many embodiments, the ingested source document is not stored or cached in the index.

The target text can be similar or identical to extracted content sections 432-436 (FIGS. 4B, 6B). In many embodiments, the target text can correspond to a stored answer of a respective one of the question-answer pairs associated with the respective location metadata. The stored answer can be similar or identical to answer 447 (FIG. 4B), answer 449 (FIG. 4B), transformed answer 647 (FIG. 6B), and/or transformed answer 649 (FIG. 6B). In many embodiments, block 810 of generating the index can be similar or identical to method 400 (FIGS. 4A and 4B) and/or method 600 (FIGS. 6A and 6B).

In some embodiments, the one or more location delimiters of the respective location metadata can include a page number of a page of the first ingested source document containing the target text. The page can be similar or identical to first page 412 (FIGS. 4A, 6A) and/or second page 413 (FIGS. 4A, 6A). In a number of embodiments, the one or more location delimiters of the respective location metadata can include a start percentage of a start of the target text within the first ingested source document. The start percentage can be similar or identical to percentage location delimiter 462 (FIG. 4B) and/or percentage location delimiter 662 (FIG. 6B). In some embodiments, the one or more location delimiters of the respective location metadata can include an end percentage of an end of the target text within the first ingested source document. In a number of embodiments, the one or more location delimiters of the respective location metadata can include a preceding sentence occurring immediately before the target text in the first ingested source document. The preceding sentence can be similar or identical to preceding sentence delimiter 463 (FIG. 4B) and/or transformed preceding sentence delimiter 663 (FIG. 6B). In some embodiments, the one or more location delimiters of the respective location metadata can include a subsequent sentence occurring immediately after the target text in the first ingested source document. The subsequent sentence can be similar or identical to subsequent sentence delimiter 464 (FIG. 4B) and/or transformed subsequent sentence delimiter 664 (FIG. 6B).

In a number of embodiments, block 810 optionally can include a block 812 of performing secure ingestion. Turning ahead in the drawings, FIG. 9 illustrates a flow chart for block 812 of performing secure ingestion. Block 812 is merely exemplary and is not limited to the embodiments presented herein. Block 812 can be employed in many different embodiments or examples not specifically depicted or described herein. In some embodiments, the procedures, the processes, and/or the activities of block 812 can be performed in the order presented. In other embodiments, the procedures, the processes, and/or the activities of block 812 can be performed in any suitable order. In still other embodiments, one or more of the procedures, the processes, and/or the activities of block 812 can be combined or skipped.

In several embodiments, block 812 of performing secure ingestion can include, for each question-answer pair of the question-answer pairs, a block 910 of transforming an answer of the question-answer pair into a first numeric vector representation. The answer can be similar or identical to extracted content sections 432-436 (FIG. 6B). The first numeric vector representation can be similar or identical to transformed answer 647 (FIG. 6B) and/or transformed answer 649 (FIG. 6B). In many embodiments, the transforming can be performed using a transformation algorithm, as described above in connection with block 640 (FIG. 6B). In several embodiments, first numeric vector representation can be generated using a neural network or another suitable machine learning algorithm.

In a number of embodiments, block 812 also can include a block 920 of transforming each of the one or more location delimiters of the respective location metadata associated with the question-answer pair into one or more second numeric vector representations. The one or more second numeric vector representations can be similar or identical to location delimiters 663-664 (FIG. 6B), and/or 673-674 (FIG. 6B). In many embodiments, the answer of the question-answer pair can be stored in the index as the first numeric vector representation, such as transformed answers 647 (FIG. 6B) and/or 649 (FIG. 6B). In various embodiments, the one or more location delimiters can be stored in the respective location metadata as the one or more second numeric vector representation, such as in location delimiters 663-664 (FIG. 6B), and/or 673-674 (FIG. 6B). In several embodiments, the one or more second numeric vector representations can be generated using a neural network, such as the neural network used in block 910.

Returning to FIG. 8, in several embodiments, method 800 also can include a block 820 of receiving a user question from a user. The user can be similar or identical to user 350 (FIG. 3). The user question can be similar or identical to question 511 (FIGS. 5A, 5B, 7A, 7B). In many embodiments, the user question can be received through a chat agent, such as chat agent 321 (FIG. 3). In many embodiments, the user question can correspond to a question of a first question-answer pair of the question-answer pairs of the index. The question can be similar or identical to question 446 (FIGS. 4B, 5A) and/or question 646 (FIGS. 6B, 7A), and the first question-answer pair can be similar or identical to question-answer pair 441 (FIGS. 4B, 5A) and/or question-answer pair 641 (FIGS. 6B, 7A). In several embodiments, block 820 can be similar or identical to block 510 (FIG. 5A) of receiving a question and/or block 710 (FIG. 7A) of receiving a question.

In a number of embodiments, method 800 additionally can include a block 830 of determining a first answer to the user question based at least in part on the respective location metadata associated with the first question-answer pair. The first answer can be similar or identical to answer text 541 (FIGS. 5B, 7B) and/or answer 551 (FIGS. 5B, 7B). In many embodiments, block 830 of determining a first answer to the user question based at least in part on the respective location metadata associated with the first question-answer pair can include determining the first answer to the user question further based at least in part on a current version of an ingested source document of the set of ingested source documents that is identified by the source document identifier of the respective location metadata associated with the first question-answer pair. The current version of the ingested source document can be similar or identical to source document 521 (FIGS. 5A, 7A).

In several embodiments, block 830 can include a block 832 of identifying an ingested source document of the set of ingested source documents based on the source document identifier of the respective location metadata associated with the first question-answer pair. In many embodiments, the ingested source document can be identified based on source document identifier 461 (FIGS. 4B, 5A) and/or source document identifier 661 (FIGS. 6B, 7A).

In several embodiments, block 830 additionally can include a block 834 of retrieving the first answer from a current version of the ingested source document based at least in part on at least one of the one or more location delimiters of the respective location metadata associated with the first question-answer pair. The current version of the ingested source document can be similar or identical to source document 521 (FIGS. 5A, 7A), which can be an updated version of the ingested source document, if there have been changes. In many embodiments, the current version of the ingested source document can be retrieved and/or loaded into memory. In several embodiments, block 834 of retrieving the first answer from a current version of the ingested source document can include determining the first answer from partial matches based at least in part on (a) at least one of the one or more location delimiters and (b) approximate string matching using the current version of the ingested source document and the target text from an earlier version of the ingested source document. The earlier version of the ingested source document can be similar or identical to source document 411 (FIGS. 4A, 6A). In a number of embodiments, the first answer can be different from the stored answer of the first question-answer pair that was stored in the index, based on the current version of the ingested source document being different from the earlier version of the ingested source document when the first question-answer pair was generated. In many embodiments, block 834 of retrieving the first answer from a current version of the ingested source document based at least in part on at least one of the one or more location delimiters of the respective location metadata associated with the first question-answer pair can include, and/or can be similar or identical to, block 520 (FIGS. 5A, 7A) of loading a current version of the source document, block 530 (FIG. 5A) of pre-processing, block 730 (FIG. 7A) of pre-processing, block 540 (FIG. 5B) of finding an answer using location meta, and/or block 740 (FIG. 7B) of finding an answer using location metadata.

In a number of embodiments, block 830 optionally can include a block 836 of performing secure retrieval. Turning ahead in the drawings, FIG. 10 illustrates a flow chart for block 836 of performing secure retrieval. Block 836 is merely exemplary and is not limited to the embodiments presented herein. Block 836 can be employed in many different embodiments or examples not specifically depicted or described herein. In some embodiments, the procedures, the processes, and/or the activities of block 836 can be performed in the order presented. In other embodiments, the procedures, the processes, and/or the activities of block 836 can be performed in any suitable order. In still other embodiments, one or more of the procedures, the processes, and/or the activities of block 836 can be combined or skipped.

In several embodiments, block 836 of performing secure retrieval can include a block 1010 of transforming into vector embeddings an ingested source document of the set of ingested source documents that is identified by the source document identifier of the respective location metadata associated with the first question-answer pair. The vector embeddings can be similar to the vector embeddings described above in connection with block 740 (FIG. 7B) of finding an answer using location metadata. In many embodiments, the vector embeddings can be generated using a neural network, which can be identical to the neural network used to generate the first numeric vector representation in block 910 (FIG. 9) and the neural network used to generate the one or more second numeric vector representations in block 920 (FIG. 9). In some embodiments, the first numeric vector representation, the one or more second numeric vector representations, and/or the vector embeddings can be further transformed using a cryptographic hash function.

In a number of embodiments, block 836 also can include a block 1020 of determining similarity scores for portions of the vector embeddings based on similarities of the vector embeddings to the first numeric vector representation and the one or more second numeric vector representations. In a number of embodiments, the similarity scores can be determined using a search or similarity function, such as cosine similarity or Manhattan distance.

In several embodiments, block 836 additionally can include a block 1030 of selecting a highest-ranked portion of the portions of the vector embeddings based on a ranking of the portions of the vector embeddings by the similarity scores.

In a number of embodiments, block 836 further can include a block 1040 of determining the first answer based on the highest-ranked portion. In many embodiments, the first answer can be determined based on the highest-ranked portion of the vector embeddings, as described above in block 740 (FIG. 7B).

Returning to FIG. 8, in a number of embodiments, method 800 further can include a block 840 of sending the first answer to the user. For example, the first answer can be sent to the user through the chat agent (e.g., 321 (FIG. 3)). In a number of embodiments, block 840 can include, and/or can be similar or identical to, block 550 (FIGS. 5B, 7B) of replying with the answer.

Returning to FIG. 3, in several embodiments, communication system 311 can at least partially perform block 410 (FIGS. 4A, 6A) of document identification, block 510 (FIG. 5A) of receiving a question, block 520 (FIGS. 5A, 7A) of loading a current version of the source document, block 550 (FIGS. 5B, 7B) of replying with the answer, block 710 (FIG. 7A) of receiving a question, block 810 (FIG. 8) of generating an index comprising (a) question-answer pairs generated based at least in part on a set of ingested source documents and (b) respective location metadata associated with each of the question-answer pairs, block 820 (FIG. 8) of receiving a user question from a user, block 830 (FIG. 8) of determining a first answer to the user question based at least in part on the respective location metadata associated with the first question-answer pair, and/or block 840 (FIG. 8) of sending the first answer to the user.

In several embodiments, ingestion system 312 can at least partially perform block 410 (FIGS. 4A, 6A) of document identification, block 420 (FIGS. 4A, 6A) of pre-processing, block 430 (FIGS. 4B, 6B) of text mining, block 440 (FIG. 4B) of question generation, block 450 (FIG. 4B) of adding location metadata, block 640 (FIG. 6B) of question generation, and/or block 650 (FIG. 6B) of adding location metadata.

In a number of embodiments, retrieval system 313 can at least partially perform block 510 (FIG. 5A) of receiving a question, block 520 (FIGS. 5A, 7A) of loading a current version of the source document, block 530 (FIG. 5A) of pre-processing, block 540 (FIG. 5B) of finding an answer using location meta, block 550 (FIGS. 5B, 7B) of replying with the answer, block 710 (FIG. 7A) of receiving a question, block 730 (FIG. 7A) of pre-processing, and/or block 740 (FIG. 7B) of finding an answer using location metadata.

In several embodiments, transformation system 314 can at least partially perform block 640 (FIG. 6B) of question generation, block 650 (FIG. 6B) of adding location metadata, block 710 (FIG. 7A) of receiving a question, block 730 (FIG. 7A) of pre-processing, block 740 (FIG. 7B) of finding an answer using location metadata, block 810 (FIG. 8) of generating an index comprising (a) question-answer pairs generated based at least in part on a set of ingested source documents and (b) respective location metadata associated with each of the question-answer pairs, block 812 (FIG. 8) of performing secure ingestion, block 830 (FIG. 8) of determining a first answer to the user question based at least in part on the respective location metadata associated with the first question-answer pair, block 836 (FIG. 8) of performing secure retrieval, block 910 (FIG. 9) of transforming an answer of the question-answer pair into a first numeric vector representation, block 920 (FIG. 9) of transforming each of the one or more location delimiters of the respective location metadata associated with the question-answer pair into one or more second numeric vector representations, block 1010 (FIG. 10) of transforming into vector embeddings an ingested source document of the set of ingested source documents that is identified by the source document identifier of the respective location metadata associated with the first question-answer pair, and/or block 1040 (FIG. 10) of determining the first answer based on the highest-ranked portion.

In a number of embodiments, similarity system 315 can at least partially perform block 540 (FIG. 5B) of finding an answer using location meta, block 740 (FIG. 7B) of finding an answer using location metadata, block 830 (FIG. 8) of determining a first answer to the user question based at least in part on the respective location metadata associated with the first question-answer pair, block 1020 (FIG. 10) of determining similarity scores for portions of the vector embeddings based on similarities of the vector embeddings to the first numeric vector representation and the one or more second numeric vector representations, and/or block 1030 (FIG. 10) of selecting a highest-ranked portion of the portions of the vector embeddings based on a ranking of the portions of the vector embeddings by the similarity scores.

In many embodiments, the techniques described herein can beneficially provide a practical application and several technological improvements. Specifically, the techniques described herein can provide for ingestion and retrieval of dynamic source documents in an automated question answering system. For example, the techniques described herein can advantageously retrieve data in real time from uncached, dynamic source files for automated question-answering through natural language chat. These techniques can greatly improve information access by automatically answering questions through an automated chat agent with fresh information from dynamic source documents.

In a number of embodiments, the techniques described herein can solve technical problems that arise within the realm of computer networks. Specifically, conventional question answering systems often cache a secondary copy of the source document, which can add administrative and storage burdens, and can result in the cached information becoming stale and out of sync with the primary data source. Additionally, storing a secondary copy in a cache can increase data security risk, which can lead to data breaches.

The techniques described herein can solve these technical problems in a manner unique to the context of computer networks. The document ingestion, mining, and indexing techniques can process primary source data files such that the question answering system can be aware of the relevant question-answer pairs that are in the documents about which users may ask. The system can advantageously store location metadata about each question-answer pair, which can beneficially allow finding and retrieving the relevant answer and information from within the source file. Later, when a user asks one of these questions, the question answering system can advantageously use that location metadata to retrieve the information and provide it back to the user through a chat agent, thereby providing the current, up-to-date version of the information from the primary source file. Furthermore, to increase data security, text-based index or location metadata in the question answering system can beneficially be transformed from text into a non-human readable format, such as numeric vector data using machine learning and/or other algorithms, which can obscure and/or encrypt the text data, yet advantageously preserve and even enhance the ability to find and retrieve the data when finding answers to user questions.

Although ingestion and retrieval of dynamic source documents in an automated question answering system has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-10 may be modified, and that the foregoing discussion of certain of these embodiments does not necessarily represent a complete description of all possible embodiments. For example, one or more of the procedures, processes, or activities of FIGS. 4A-10 may include different procedures, processes, and/or activities and be performed by many different modules, in many different orders and/or one or more of the procedures, processes, or activities of FIGS. 4A-10 may include one or more of the procedures, processes, or activities of another different one of FIGS. 4A-10. As another example, the systems within system 300, question answering system 310, and/or web server 320 of FIG. 3 can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions configured to run on the one or more processors and perform:
generating an index comprising (a) question-answer pairs generated based at least in part on a set of ingested source documents and (b) respective location metadata associated with each of the question-answer pairs, the respective location metadata comprising a source document identifier of a first ingested source document of the set of ingested source documents and one or more location delimiters indicating a location of target text within the first ingested source document, the target text corresponding to a stored answer of a first question-answer pair of the question-answer pairs associated with the respective location metadata for the first question-answer pair, and the first ingested source document being dynamic and subject to change, wherein generating the index further comprises:
transforming, using machine learning, the one or more location delimiters of the respective location metadata associated with the first question-answer pair into a numeric vector representation of the one or more location delimiters such that the one or more location delimiters is stored in the respective location metadata as the numeric vector representation of the one or more location delimiters;
receiving a user question from a user, the user question corresponding to a question of the first question-answer pair of the question-answer pairs of the index; and
determining a first answer to the user question from a current version of the first ingested source document based at least in part on the respective location metadata associated with the first question-answer pair, wherein the current version of the first ingested source document may be different from an earlier version of the first ingested source document when the first question-answer pair was generated.

2. The system of claim 1 further comprising:
sending the first answer to the user.

3. The system of claim 1, wherein determining the first answer to the user question further comprises:
determining the first answer to the user question from the current version of the first ingested source document based at least in part on the source document identifier of the respective location metadata associated with the first question-answer pair.

4. The system of claim 1, wherein determining the first answer to the user question further comprises:
identifying the first ingested source document based on the source document identifier of the respective location metadata associated with the first question-answer pair; and
retrieving the first answer from the current version of the first ingested source document based at least in part on at least one of the one or more location delimiters of the respective location metadata associated with the first question-answer pair.

5. The system of claim 4, wherein retrieving the first answer from the current version of the first ingested source document further comprises:
determining the first answer from partial matches based at least in part on (a) at least one of the one or more location delimiters and (b) approximate string matching using the current version of the first ingested source document and the target text from the earlier version of the first ingested source document.

6. The system of claim 4, wherein the first answer is different from the stored answer of the first question-answer pair that was stored in the index, based on the current version of the first ingested source document being different from the earlier version of the first ingested source document when the first question-answer pair was generated.

7. The system of claim 1, wherein the one or more location delimiters of the respective location metadata comprise at least one of:
a page number of a page of the first ingested source document containing the target text;
a start percentage of a start of the target text within the first ingested source document;
an end percentage of an end of the target text within the first ingested source document;
a preceding sentence occurring immediately before the target text in the first ingested source document; and
a subsequent sentence occurring immediately after the target text in the first ingested source document.

8. The system of claim 1, wherein generating the index further comprises, for each question-answer pair of the question-answer pairs:
transforming a respective answer of the each question-answer pair into a respective first numeric vector representation; and
transforming each respective location delimiter of the one or more location delimiters of the respective location metadata associated with the each question-answer pair into one or more second respective numeric vector representations, wherein:
the respective answer of the each question-answer pair is stored in the index as the respective first numeric vector representation; and
the each respective location delimiter of the one or more location delimiters are stored in the respective location metadata as the one or more second respective numeric vector representations.

9. The system of claim 8, where determining the first answer to the user question further comprises:
transforming into vector embeddings an ingested source document of the set of ingested source documents that is identified by the source document identifier of the respective location metadata associated with the first question-answer pair;
determining similarity scores for portions of the vector embeddings based on similarities of the vector embeddings to the respective first numeric vector representation and the respective one or more second numeric vector representations;
selecting a highest-ranked portion of the portions of the vector embeddings based on a ranking of the portions of the vector embeddings by the similarity scores; and
determining the first answer based on the highest-ranked portion.

10. The system of claim 9, wherein the similarity scores are determined using a similarity function, the similarity function comprising cosine similarity or Manhattan distance.

11. The system of claim 9, wherein the respective first numeric vector representation, the respective one or more second numeric vector representations, and the vector embeddings are generated using a neural network.

12. The system of claim 11, wherein the respective first numeric vector representation, the respective one or more second numeric vector representations, and the vector embeddings are further transformed using a cryptographic hash function.

13. A method being implemented via execution of computing instructions configured to run at one or more processors and stored at one or more non-transitory computer-readable media, the method comprising:
generating an index comprising (a) question-answer pairs generated based at least in part on a set of ingested source documents and (b) respective location metadata associated with each of the question-answer pairs, the respective location metadata comprising a source document identifier of a first ingested source document of the set of ingested source documents and one or more location delimiters indicating a location of target text within the first ingested source document, the target text corresponding to a stored answer of a first question-answer pair of the question-answer pairs associated with the respective location metadata for the first question-answer pair, and the first ingested source document being dynamic and subject to change, wherein generating the index further comprises:
transforming, using machine learning, the one or more location delimiters of the respective location metadata associated with the first question-answer pair into a numeric vector representation of the one or more location delimiters such that the one or more location delimiters is stored in the respective location metadata as the numeric vector representation of the one or more location delimiters;
receiving a user question from a user, the user question corresponding to a question of the first question-answer pair of the question-answer pairs of the index; and
determining a first answer to the user question from a current version of the first ingested source document based at least in part on the respective location metadata associated with the first question-answer pair, wherein the current version of the first ingested source document may be different from an earlier version of the first ingested source document when the first question-answer pair was generated.

14. The method of claim 13 further comprising:
sending the first answer to the user.

15. The method of claim 13, wherein determining the first answer to the user question further comprises:
determining the first answer to the user question from the current version of the first ingested source document based at least in part on the source document identifier of the respective location metadata associated with the first question-answer pair.

16. The method of claim 13, wherein determining the first answer to the user question further comprises:
identifying the first ingested source document based on the source document identifier of the respective location metadata associated with the first question-answer pair; and
retrieving the first answer from the current version of the first ingested source document based at least in part on at least one of the one or more location delimiters of the respective location metadata associated with the first question-answer pair.

17. The method of claim 16, wherein retrieving the first answer from the current version of the first ingested source document further comprises:
determining the first answer from partial matches based at least in part on (a) at least one of the one or more location delimiters and (b) approximate string matching using the current version of the first ingested source document and the target text from the earlier version of the first ingested source document.

18. The method of claim 16, wherein the first answer is different from the stored answer of the first question-answer pair that was stored in the index, based on the current version of the first ingested source document being different from the earlier version of the first ingested source document when the first question-answer pair was generated.

19. The method of claim 13, wherein the one or more location delimiters of the respective location metadata comprise at least one of:
a page number of a page of the first ingested source document containing the target text;
a start percentage of a start of the target text within the first ingested source document;
an end percentage of an end of the target text within the first ingested source document;
a preceding sentence occurring immediately before the target text in the first ingested source document; and
a subsequent sentence occurring immediately after the target text in the first ingested source document.

20. The method of claim 13, wherein generating the index further comprises, for each question-answer pair of the question-answer pairs:
for each question-answer pair of the question-answer pairs:
transforming a respective answer of the each question-answer pair into a respective first numeric vector representation; and transforming each respective location delimiter of the one or more location delimiters of the respective location metadata associated with the each question-answer pair into one or more second respective numeric vector representations,
wherein:
the respective answer of the each question-answer pair is stored in the index as the respective first numeric vector representation; and
the each respective location delimiter of the one or more location delimiters are stored in the respective location metadata as the one or more second respective numeric vector representations.

21. The method of claim 20, where determining the first answer to the user question further comprises:
transforming into vector embeddings an ingested source document of the set of ingested source documents that is identified by the source document identifier of the respective location metadata associated with the first question-answer pair;
determining similarity scores for portions of the vector embeddings based on similarities of the vector embeddings to the respective first numeric vector representation and the respective one or more second numeric vector representations;
selecting a highest-ranked portion of the portions of the vector embeddings based on a ranking of the portions of the vector embeddings by the similarity scores; and
determining the first answer based on the highest-ranked portion.

22. The method of claim 21, wherein the similarity scores are determined using a similarity function, the similarity function comprising cosine similarity or Manhattan distance.

23. The method of claim 21, wherein the respective first numeric vector representation, the respective one or more second numeric vector representations, and the vector embeddings are generated using a neural network.

24. The method of claim 23, wherein the respective first numeric vector representation, the respective one or more second numeric vector representations, and the vector embeddings are further transformed using a cryptographic hash function.

* * * * *